United States Patent [19]
Ban

[11] Patent Number: 5,390,728
[45] Date of Patent: Feb. 21, 1995

[54] AIR CONDITIONER FOR USE IN A VEHICLE

[75] Inventor: Koichi Ban, Tokai, Japan

[73] Assignee: Nippondenso Co., Ltd., Kariya, Japan

[21] Appl. No.: 91,364

[22] Filed: Jul. 15, 1993

[30] Foreign Application Priority Data

Jul. 15, 1992 [JP] Japan .................. 4-188000

[51] Int. Cl.$^6$ ............................................. F25B 29/00
[52] U.S. Cl. ........................................ 165/16; 165/22;
  165/30; 165/42; 165/43; 62/186; 62/244
[58] Field of Search ................ 165/16, 22, 30, 42,
  165/43; 62/186, 244

[56] References Cited

U.S. PATENT DOCUMENTS

| | | | |
|---|---|---|---|
| 4,362,026 | 12/1982 | Miller | 165/16 |
| 4,364,513 | 12/1982 | Tsuzuki et al. | 165/43 |
| 4,429,733 | 2/1984 | Hara et al. | 165/16 |
| 4,482,009 | 11/1984 | Nishimura et al. | |
| 4,485,632 | 12/1984 | Gallagher | 165/16 |
| 4,537,245 | 8/1985 | Nishimura et al. | 165/43 |
| 4,570,448 | 2/1986 | Smith | 165/16 |

FOREIGN PATENT DOCUMENTS 57-167819 10/1982 Japan .
59-186114 12/1984 Japan .
61-128114 8/1986 Japan .

*Primary Examiner*—John K. Ford
*Attorney, Agent, or Firm*—Cushman, Darby & Cushman

[57] ABSTRACT

The present invention provides an air conditioner for use in a vehicle that gives a comfortable air-conditioning feeling even when only one passenger is seated in a vehicle cabin, and the air-conditioning load of a heat exchanging means such as an evaporator can be reduced as low as possible. When only a driver is seated and an inside air circulation mode is employed in a cooling mode operation, the air blowing mode on the passenger seat side is set to a foot mode, and the degree of opening of an air mix damper 15b on the passenger seat side is set at 0%. Due to the foregoing, a cold wind blown out from a passenger seat lower outlet 11b is immediately sucked into an inside air entrance 25 open to a foot portion of the passenger seat, so that the temperature of an upstream position of the air flow of an evaporator 23 can be lowered. As a result, the cooling load of the evaporator 23 is reduced, and the power consumption of the compressor 27 can be reduced.

8 Claims, 15 Drawing Sheets

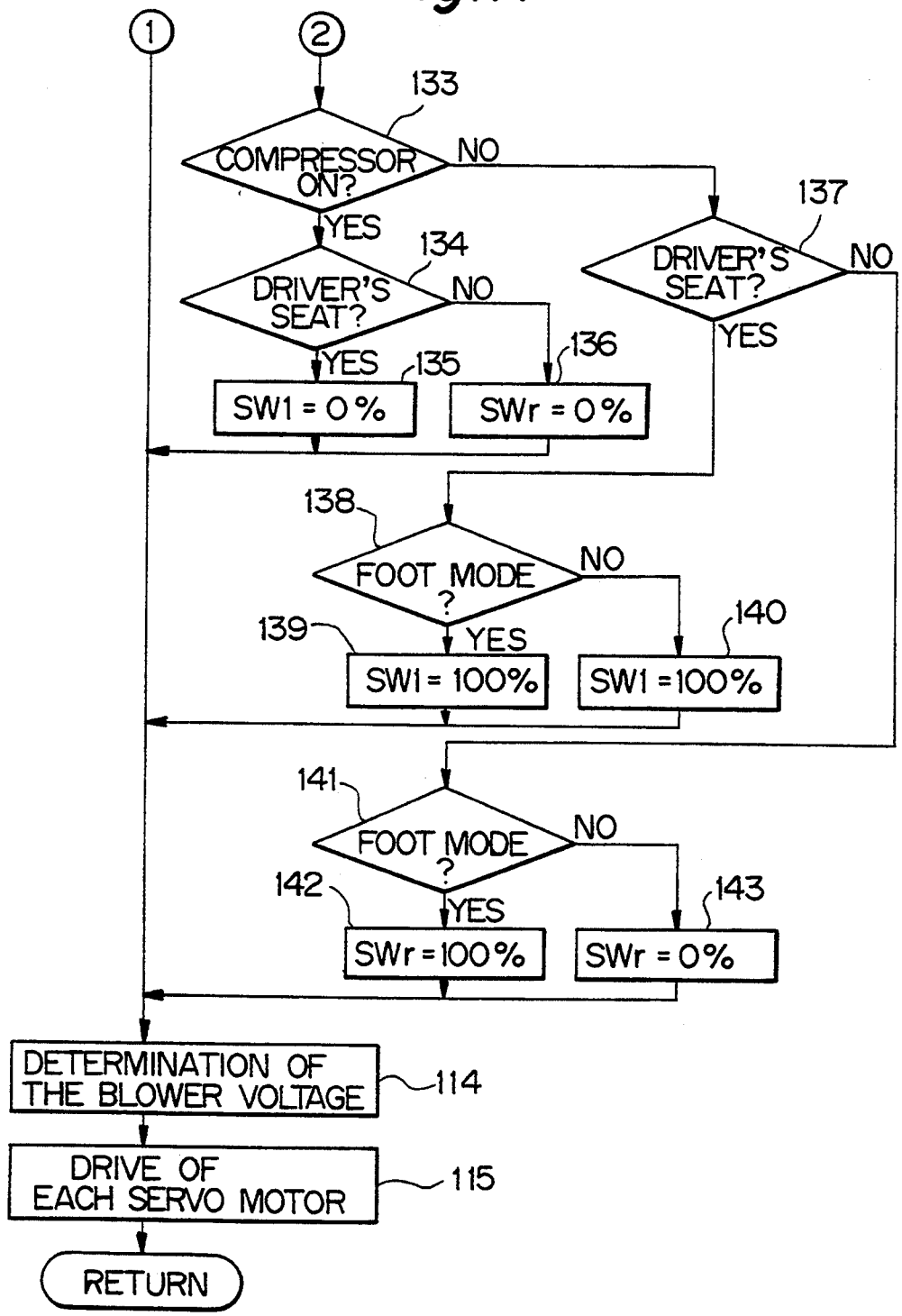

AIR CONDITIONER FOR USE IN A VEHICLE

BACKGROUND OF THE INVENTION

1. Field of the Invention

The present invention relates to an air conditioner, for use in a vehicle, that blows conditioned air to a plurality of spaces in a vehicle cabin, and more particularly relates to air conditioning control conducted when only one passenger is seated in the vehicle cabin.

2. Description of the Related Art

For example, as disclosed in Japanese Unexamined Patent Publication (Kokai) No. 57-167819, an air conditioner for use in a vehicle is conventionally known in which the temperature in a space on the driver's seat side and that in a space on the passenger seat side are independently controlled in accordance with the set temperature of a temperature set device on the driver's seat side and that of a temperature setting device on the passenger seat side.

According to the conventional technique described above, even when only a driver is seated in a vehicle cabin, the temperature in a space on the passenger seat side is controlled. Accordingly, air conditioning can be comfortably conducted for the driver. On the other hand, energy is wasted to conduct air conditioning for the space on the passenger seat side, which is referred to as a first problem, hereinafter.

According to Japanese Unexamined Utility Model Publication (Kokai) Nos. 59-186114 and 61-128114, an air conditioner for use in a vehicle is disclosed in which only a space on the driver's seat side is air-conditioned and a space on the passenger seat side and that on the rear seat's side are not air-conditioned when only a driver is seated in the vehicle cabin.

In this air conditioner, the first problem described above can be solved from the viewpoint of conducting air conditioning only in the space on the driver's seat side. On the other hand, when air conditioning is conducted in the rays of the summer sun in accordance with the inside air circulation mode, whereas the space on the passenger seat side and that on the rear seat side are not air-conditioned, the temperature rises in these spaces. As a result, the average temperature in the vehicle cabin is raised. Inside air of a high temperature is sucked into an air conditioning duct from an inside air entrance, and introduced to an upstream portion of an evaporator. As a result, the temperature of air in the upstream portion of the evaporator is raised, and a difference of enthalpy of air is increased before and after it passes through the evaporator.

When the difference of enthalpy of air before and after it passes through the evaporator is increased, the cooling load of the evaporator is increased. As a result, the power consumption of a compressor is increased, which is referred to as a second problem, hereinafter.

The first and second problems are not necessarily caused when the difference of enthalpy of air before and after it passes through the evaporator is increased. For example, in the case where a heat exchanger such as a hot water type heater, electric heater, combustion type heater and Peltier element is provided instead of the evaporator, the first and second problems are also caused when the difference of enthalpy of air before and after it passes through the heat exchanger is increased.

SUMMARY OF THE INVENTION

In view of the first and second problems, an object of the present invention is to provide an air conditioner for use in a vehicle by which air conditioning can be comfortably conducted for a passenger when only one passenger is seated in the vehicle and at the same time the air conditioning load of a heat exchanger such as an evaporator and hot water type heater can be reduced as much as possible.

In order to accomplish the aforementioned object, the present invention provides an air conditioner for use in a vehicle essentially constructed in the following manner.

The present invention provides an air conditioner for use in a vehicle, comprising: an air duct, one end of which is connected with an inside air entrance open to a vehicle cabin and also connected with an outside air entrance open to the outside of the vehicle cabin, and the other end of which is connected with a plurality of outlets open at positions opposed to each seat in the vehicle cabin; an air blowing means to generate an air flow in the air duct; a heat exchanging means provided in the air duct so as to exchange heat with air in the air duct; an inside and outside air change-over means selectively changing over between the inside and the outside air entrances; an air outlet change-over means selectively changing over the plurality of air outlets; a seating detection means to detect whether or not each passenger is seated in each seat; and an air outlet change-over control means controlling the outlet change-over means so that an outlet open to a position opposed to a passenger seat and an outlet most close to the inside air entrance can be opened when it is judged by the seating detection means that only one passenger is seated in his seat and also when the inside air entrance is opened by the inside and outside air change-over means.

In the first embodiment showing the essential technical construction of the present invention, the air conditioner for use in a vehicle, comprises: an air duct, one end of which is connected with an inside air entrance open to a vehicle cabin, and the other end of which is connected with a plurality of outlets open at positions opposed to each seat in the vehicle cabin; an air blowing means to generate an air flow in the air duct; a heat exchanging means provided in the air duct so as to exchange heat with air in the air duct; an air outlet change-over means selectively changing over the plurality of air outlets; a seating detection means to detect whether or not each passenger is seated in each seat; and an air outlet change-over control means controlling the outlet change-over means so that an outlet open to a position opposed to a passenger seat and an outlet closest to the inside air entrance can be opened when it is judged by the seating detection means that only one passenger is seated in his seat.

In the above description, the term of each seat does not necessarily indicate all of the seats including the driver's seat, the passenger seat and the rear seats. For example, the term each seat may indicate only the driver's and passenger seats. In the above description, the term a plurality of outlets includes a case in which each seat is provided with one air outlet, and also includes a case in which each seat is provided with a plurality of air outlets. In the above description, a case in which an outlet closest to the inside air entrance is opened includes not only a case in which the outlet is completely opened but also a case in which the outlet is opened a little.

In the above essential embodiment of the present invention, when the blowing means is driven, the inside air is introduced into the air duct through the inside air entrance.

The air outlet change-over control means controls the outlet change-over means so that an outlet open to a position opposed to a passenger seat and an outlet closest to the inside air entrance can be opened only when the passenger is seated in his seat. As a result of the foregoing, the introduced air is subjected to heat exchange by the heat exchange means, and blows against the passengers, and also blows out from the outlet closest to the inside air entrance. The conditioned air blown out from the outlet is sucked into the air duct through the inside air entrance located close to this outlet. As a result, the passenger feels comfortable when the conditioned air blows toward him, and the conditioned air blown out from the outlet closest to the inside air entrance can be sucked into the inside air entrance without being circulated in the entire vehicle cabin.

As described above, the conditioned air is sucked into the air duct from the inside air entrance without being circulated in the entire vehicle cabin. In other words, even when the average temperature in the vehicle cabin is raised due to the heat transmitted from the outside of the vehicle cabin, the conditioned air is not affected by this heat and is sucked into the air duct from the inside air entrance with the temperature of the air maintained to be substantially the same. Then, the conditioned air is introduced to the upstream position of air flow of the heat exchange means.

For example, when the aforementioned heat exchange means is used as a cooling means to cool air, a cold wind is blown out from an outlet closest to the inside air entrance. Even when the average temperature in the vehicle cabin is raised by the rays of the sun at this time, the cold wind is sucked back into the inside air entrance without the temperature of the cold wind being raised. Consequently, the cold wind, the temperature of which is maintained to be low, is introduced to the upstream position of the air flow of the cooling means (the heat exchange means). When the temperature of air in the upstream portion of the cooling means is low, the difference of the enthalpy of the air before and after it passes through the cooling means becomes small, so that the air conditioning load of the cooling means is reduced. As a result of the foregoing, for example, in the case where electric power is supplied to the cooling means from a battery of the vehicle, power consumption of the battery is reduced.

For example, in the case where the aforementioned heat exchanging means is used as an air heating means to heat air, a hot wind is blown from an outlet closest to the inside air entrance. Even when the average temperature in the vehicle cabin is lowered by to the cold atmosphere at this time, the hot wind is sucked back into the air duct through the inside air entrance before the hot wind is sufficiently cooled Then, the hot wind sucked back in and having a high temperature is introduced to the upstream position of the air flow of the heating means (the heat exchange means). When the temperature of air in the upstream position of the air flow in the heating means is high, the difference of temperature of the air before and after it passes through the heating means is small, so that the air conditioning load of the heating means is reduced. As a result of the foregoing, for example, in the case where electric power is supplied to the heating means from a battery of the vehicle, power consumption of the battery is reduced.

BRIEF DESCRIPTION OF THE DRAWINGS

FIG. 17 is a flowchart showing the procedure of air conditioning control of the third example.

DESCRIPTION OF THE PREFERRED EMBODIMENTS

With reference to the attached drawings, a specific example of the air conditioner for use in a vehicle of the present invention will be explained in detail as follows.

Figure 1:
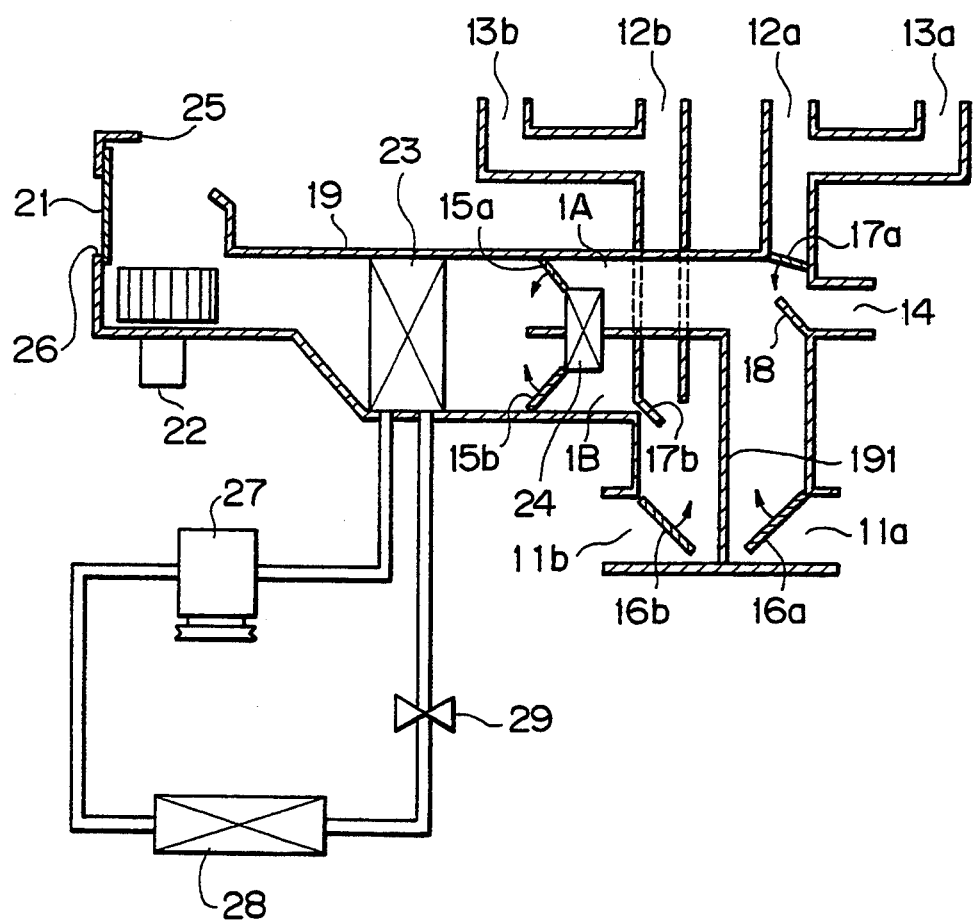
FIG. 1 is an overall arrangement view of the air duct system of the first example of the present invention.

FIG. 1 is a schematic illustration showing an example (the first example) to realize the essential technical construction of the air conditioner for use in a vehicle according to the present invention. In the drawing, the following units are shown: an air duct 19, one end of which is connected with an inside air entrance 25 open to a vehicle cabin and an outside air entrance 26 open to the outside, and the other end of which is connected with a plurality of outlets 11, 12, 13 open at a positions opposed to each seat in the vehicle cabin; a blowing means 22 to generate an air flow in the air duct 19; a heat exchanging means 23 provided in the air duct 19 so as to exchange heat with air in the air duct 19; an inside and outside air change-over means 21 selectively changing over between the inside and the outside air entrances 25, 26; an air outlet change-over means 16, 17 selectively changing over the plurality of air outlets 11, 12, 13; a seating detection means to detect whether or not each passenger is seated in each seat; and an air outlet change-over control means controlling the outlet change-over means so that one outlet in the plurality of outlets 11, 12, 13 opens at a position opposed to a passenger's seat and an outlet closest to the inside air entrance 25 can be opened when it is judged by the seating detection means that only the passenger is seated in his seat and also when the inside air entrance 25 is opened by the inside and outside air change-over means 21.

The above example will be explained in further detail as follows.

In the upstream position of the air flow in the air conditioning duct 19, there are provided an inside and an outside air change-over dampers 21 to change over between the inside and the outside air, and a blower 22 to generate an air flow in the air conditioning duct 19. This inside and outside air change-over damper 21 is driven by a servo motor 40 (shown in FIG. 2), and the blower 22 is driven by a motor controller 37. In the first example, the air passage is composed of the air conditioning duct 19, and the inside air entrance 25 open at the leg position of a passenger seat and the outside air entrance 26 open to the outside are formed at one end of this air conditioning duct 19. In the aforementioned first example, the blowing means is composed of the blower 22. In the downstream position of the air flow of the blower 22, there is provided an evaporator 23 to exchange heat with the air flowing in the air conditioning duct 19 so as to dry and cool the air. This evaporator 23 composes a refrigerating cycle together with a compressor 27, a condenser 28, and an expansion valve 29 that is an expansion means. In this example, the heat exchanging means is composed of the evaporator 23.

In the downstream position of the air flow of the evaporator 23, there is provided a heater core 24 that is a heater to reheat a cold wind sent from the evaporator 23. This heater core 24 is a heat exchanger, the heat source of which is engine cooling water heated by an engine not shown.

In the downstream position of the air flow of the heater core 24, there is provided a partition wall 191. An air conditioning system 1A on the driver's seat side and an air conditioning system on the passenger seat side are separated by this partition wall 191. The temperature of conditioned air in each of the air conditioning systems 1A, 1B can be controlled by adjusting the degree of opening of each of air mix dampers 15a, 15b provided in the upstream position of the air flow of the heater core 24. These air mix dampers 15a, 15b are driven by servo motors 38, 39 (shown in FIG. 2), and these servo motors 38, 39 are independently controlled in accordance with a signal sent from a central processing unit 3 (shown in FIG. 2). In the first example, the air conditioning system 1A on the driver's seat side and the air conditioning system 1B on the passenger seat side form the air duct for each seat. Also, in this example, the air mix dampers 15a, 15b form the temperature adjustment means.

In the downstream of the air flow of the air conditioning system 1A on the driver's seat side, there are provided a driver's seat lower air outlet 11a that is open at a position opposed to the driver's seat leg position, driver's seat upper air outlets 12a, 13a that are open at positions opposed to the upper position of the driver's seat, and a defroster air outlet 14 that is open at a position opposed to a windshield. In this connection, the driver's seat upper air outlet 12a is provided for blowing air against the left upper half of the body of the driver, and the driver's seat upper air outlet 13a is provided for blowing air against the right upper half of the body of the driver.

In the downstream of the air flow of the air conditioning system 1B on the passenger seat side, there are provided a passenger seat lower air outlet 11b and passenger seat upper air outlets 12b, 13b that are open at positions opposed to the upper position of the passenger seat. In this connection, the passenger seat upper air outlet 12b is provided for blowing air against the right upper half of the body of the passenger, and the passenger seat upper air outlet 13b is provided for blowing air against the left upper half of the body of the passenger.

Also, the air conditioning system 1A on the driver's seat side includes a driver's seat lower outlet damper 16a to open and close the driver's seat lower air outlet 11a, a driver's seat upper outlet damper 17a to open and close the driver's seat upper outlets 12a, 13a, and a defroster outlet damper 18 to open and close the defroster outlet 14. The driver's seat lower outlet damper 16a and the driver's seat upper outlet damper 17a are driven by a servo motor 41 (shown in FIG. 2), and the defroster outlet damper 18 is driven by a servo motor 43 (shown in FIG. 2).

The air conditioning system 1B on the passenger seat side includes a passenger seat lower outlet damper 16b to open and close the passenger seat lower outlet 11b, and an passenger seat upper outlet damper 17b to open and close the passenger seat upper outlets 12b, 13b. The passenger seat lower outlet damper 16b and the passenger seat upper outlet damper damper 17b are driven by a servo motor 42 (shown in FIG. 2). In the first example, the outlet changeover means includes the driver's seat lower outlet damper 16a, passenger seat lower outlet damper 16b, driver's seat upper outlet damper 17a, passenger seat upper outlet damper 17b, and servo motors 41, 42.

Figure 2:
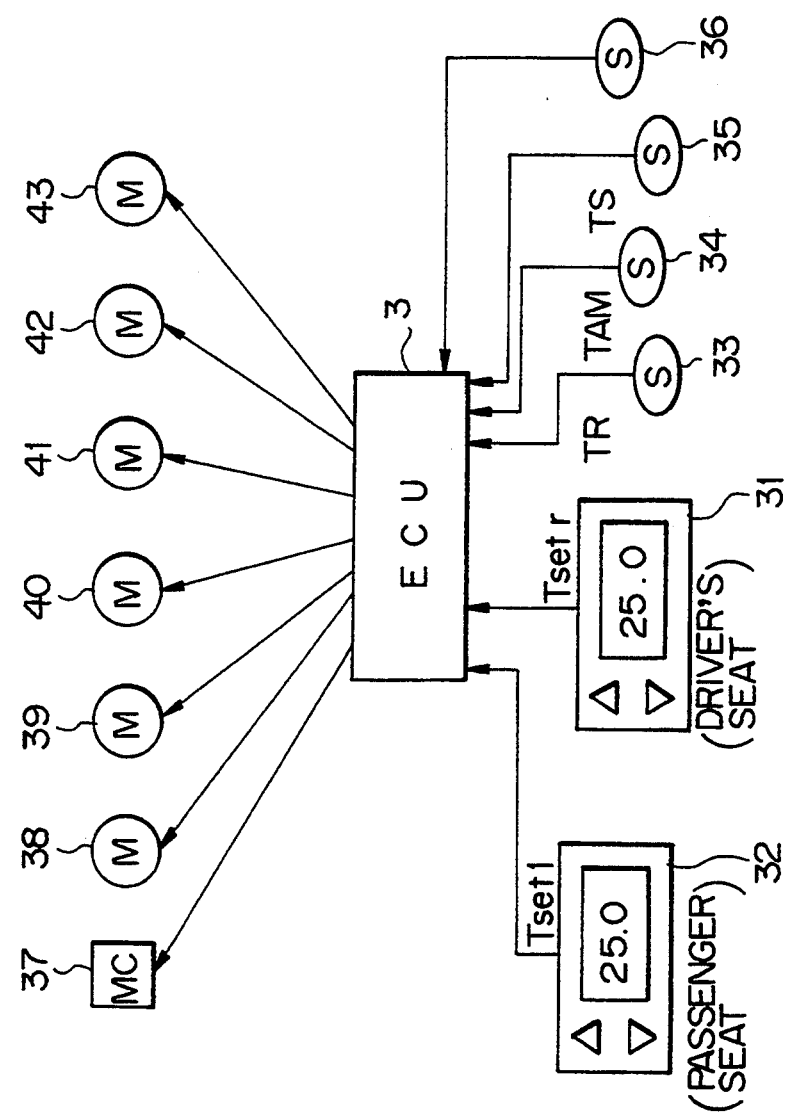
FIG. 2 is a schematic illustration showing a refrigerating cycle used in the first example.

Next, with reference to FIG. 2, the control system of this example will be explained as follows.

The central processing unit (ECU) 3 is connected with a temperature setting device 31 to set the temperature in the space on the driver's seat side, temperature setting device 32 to set the temperature in the space on the passenger seat side, inside air temperature sensor 33, outside air temperature sensor 34, sun ray sensor 35, and passenger sensor 36. In accordance with the input signals sent out by these sensors, by the procedure described later, the central processing unit 3 outputs drive signals to a motor controller 37 for the blower 22, servo motor 38 for the air mix damper 15a, servo motor 39 for the air mix damper 15b, servo motor 40 for the inside and outside air changeover damper 21, servo motor 41 for the driver's seat lower outlet damper 16a and the driver's seat upper outlet damper 17a, servo motor 42 for the passenger seat lower outlet damper 16b and the passenger seat upper outlet damper 17b, and servo motor 43 for the defroster outlet damper 18.

In this example, the seating detection means is composed of the passenger sensor 36. Specifically, the seating detection means is composed in such a manner that a seated passenger is detected when the tongue of a seat belt is fitted to a buckle. Alternatively, the seating detection means may be composed in such a manner that the seated passenger is detected by an infrared ray sensor provided on the ceiling of the vehicle cabin.

In this connection, in the air conditioner for use in a vehicle of this example of the present invention, the heat exchanging means may be composed of an evaporator that composes a refrigerating cycle together with a compressor, condenser and decompression means. Since the heat exchanging means is composed of the evaporator in the construction described above, a cold wind blows out from each outlet.

In this case, when the outlet changeover control means is controlled, the passenger feels comfortable due to a cold wind blown out from the outlet, and at the same time a cold wind also blows out from an outlet closest to the inside air entrance, so that the temperature of air in the upstream position of the air flow of the evaporator can be lowered. As a result of the foregoing, the difference of enthalpy of air before and after it passes through the evaporator can be reduced, so that the cooling load of the evaporator can be reduced. Whereas the evaporator is activated by the compressor, power consumption of the compressor can be lowered when the cooling load of the evaporator is reduced.

The following is an explanation of an example of the operation of the aforementioned control system used for the air conditioner for use in a vehicle of the first example of the present invention.

That is, for example, when the foot mode is selected on the driver's seat side in this control system, the driver's seat lower outlet damper 16a is opened, and the driver's seat upper outlet damper 17a is closed. When the face mode is selected on the driver's seat side, the driver's seat lower outlet damper 16a is closed, and the driver's seat upper outlet damper 17a is opened. When the high level mode is selected on the driver's seat side, the aforementioned dampers 16a, 17a are opened at an arbitrary degree of opening under the condition that the total air flow amount is maintained at a predetermined value. When the foot, face and high level modes are selected on the passenger seat side, the dampers 16b, 17b are opened and closed in the same manner as the driver's seat side.

When the degree of opening of a driver's seat side cold wind bypass damper provided in a driver's seat side cold wind bypass duct (not shown) is adjusted, the temperature of a wind from the driver's seat lower outlet 11a and that of a wind from the driver's seat upper outlet 12a are independently controlled. When the degree of opening of a passenger seat side cold wind bypass damper provided in a passenger seat side cold wind bypass duct (not shown) is adjusted, the temperature of a wind of the passenger seat lower outlet 11b and that of a wind of the passenger seat upper outlet 12b are independently controlled.

The lower limit of the temperature of conditioned air blown out from the driver's seat lower outlet 11a and that of conditioned air blown out from the passenger seat lower outlet 11b are set at a value so that the passengers do not feel cold (for example, the temperature is set at 35° C.), and the upper limit of the temperature of conditioned air blown out from the driver's seat upper outlets 12a, 13a and that of conditioned air blown out from the passenger seat upper outlets 12b, 13b are set at a value so that the passengers do not feel uncomfortable.

Figure 3:
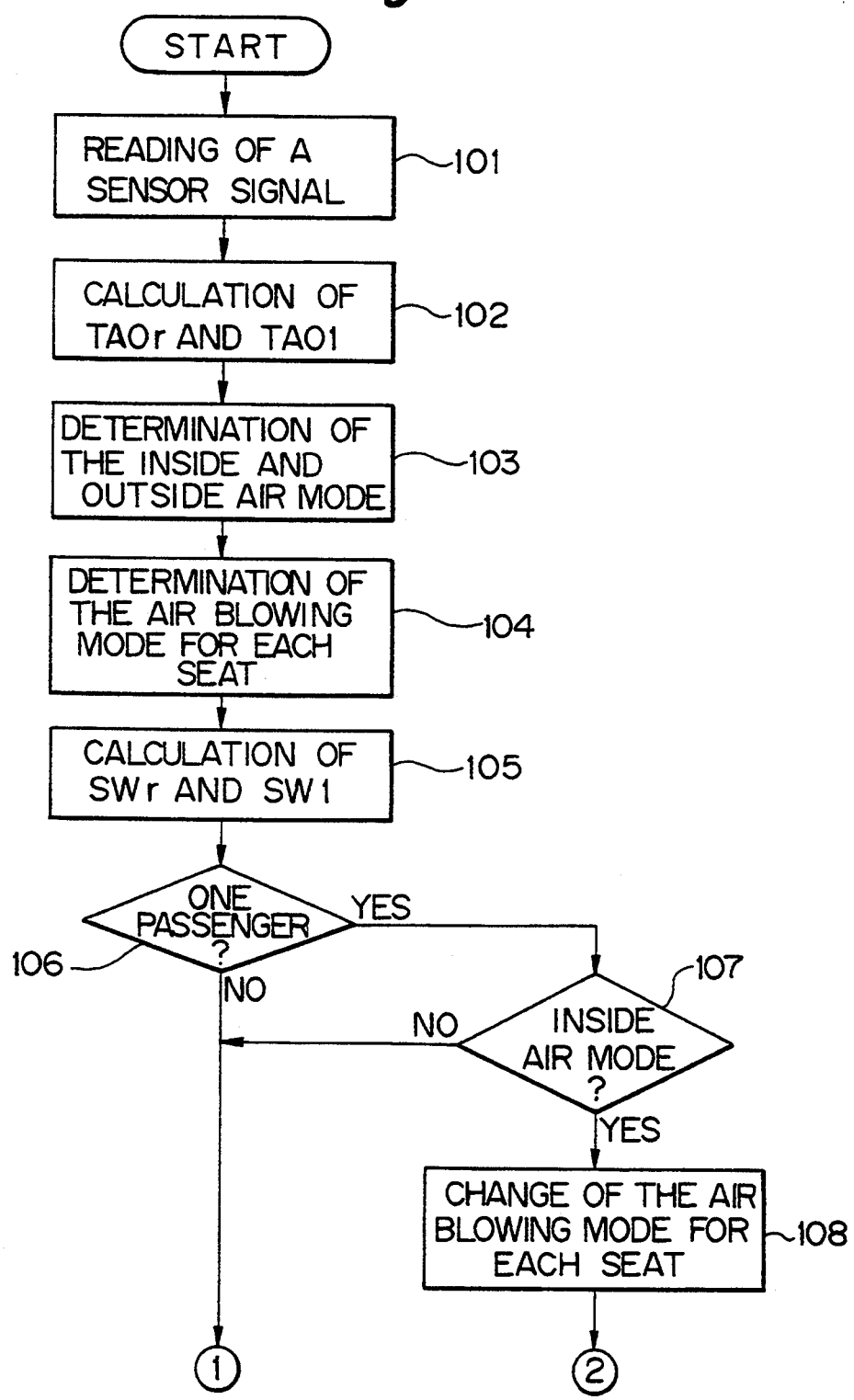
FIG. 3 is a flowchart showing the procedure of air conditioning control of the first example.

Next, with reference to FIGS. 3 and 4, the procedure of ECU 3 will be explained as follows.

First, in step 101, the signals sent out from a temperature setting device 31, a temperature setting device 32, an inside air temperature sensor 33, an outside air temperature sensor 34, a sun ray sensor 35 and a passenger sensor 36 are read.

Next, in step 102, the target blowing air temperature (TAOr) on the driver's seat side is calculated in accordance with the following expression 1, and the target blowing air temperature (TAOl) on the passenger seat side is calculated in accordance with the following expression 2.

$$TAOr = Kset \times Tsetr - Kr \times Tr - Kam \times Tam - Ks \times Ts + C \tag{1}$$

$$TAOl = Kset \times Tsetl - Kr \times Tr - Kam \times Tam - Ks \times Ts + C \tag{2}$$

In the above expressions, Tsetr is the temperature that is set by the temperature setting device 31 on the driver's seat side, Tsetl is the temperature that is set by the temperature setting device 32 on the passenger seat side, Tr is the temperature of inside air, Tam is the temperature of outside air, and Ts is an amount of the rays of the sun, Kset, Kr, Kam and Ks are respectively the gains of the setting temperature, inside air temperature, outside air temperature and amount of the rays of the sun.

Figure 5:
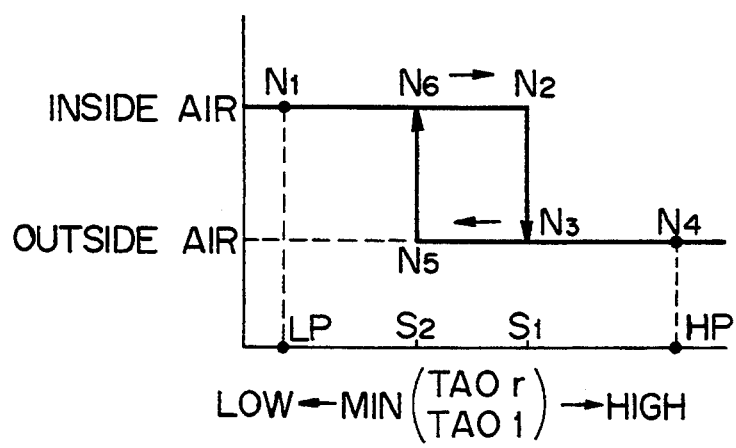
FIG. 5 is a correlation diagram of the target blowing air temperature (TAO) and the mode of inside and outside air in the first example.

Next, in step 103, the inside and outside air mode is determined in accordance with TAO, which is the smaller one between TAOr and TAOl that have been calculated in step 102, and the correlation shown in FIG. 5.

With reference to FIG. 5, an example of the procedure to determine the mode of the present invention will be briefly explained here.

For each air conditioner for use in a vehicle, a relation between the inside and the outside air introduction modes is previously found with respect to the change in the aforementioned target blowing air temperatures (TAOr) and (TAOl), and for example, a table for control use shown in FIG. 5 is previously made.

The essential technical concept of this control table is based on the outside air introduction mode. Accordingly, the air conditioner is constructed so that the outside air introduction mode can be necessarily set in a normal operation.

On the other hand, the inside air introduction mode is used in a case in which a quick cooling operation is required because the temperature of a vehicle cabin is extremely high and the temperature is much different from the target temperature of the vehicle cabin.

Accordingly, in the aforementioned case, it is necessary to set the temperature of air blown into the vehicle cabin at a very low value. Therefore, the target air blowing temperatures (TAOr) and (TAOl) must be low.

In this case, (TAOr) and (TAOl) are set at the left and on the horizontal axis in the graph shown in FIG. 5, for example, (TAOr) and (TAOl) are set at a point LP in the graph. Consequently, the inside air introduction mode is employed at this time. Concerning the mode selection point N, the inside air introduction mode is selected at a position of Nl in FIG. 5. When the aforementioned temperature control operation is continued, the temperature in the vehicle cabin is gradually lowered, so that the difference between the temperature in the vehicle cabin and the target temperature is reduced. For that reason, the target air blowing temperatures (TAOr) and (TAOl) are set high. Therefore, they are shifted to the right on the horizontal axis in the graph.

Consequently, the mode selection point N moves from point N1, passes through point N6, and arrives at point N2.

The position of selection point N2 is a threshold value point at which a changeover operation between the inside and outside air introduction modes is carried out. In the case where the target blowing air temperatures (TAOr) and (TAOl) cross the threshold value point S1 on the horizontal axis from the left to the right, the mode selection point is changed over from N2 to N3, so that the outside air introduction mode can be set.

On the contrary, that is, in the case where the vehicle cabin temperature is extremely low compared to the target value, the target blowing air temperatures (TAOr) and (TAOl) are set high. Therefore, the target values are set at the right end on the horizontal axis, for example, the target values are set at the level of the point HP. At this point of time, the outside air introduction mode is employed, and the mode selection point N is located at a position of N4 in FIG. 5 so as to select the outside air introduction mode. When the aforementioned temperature control operation is continued, the vehicle cabin temperature is gradually raised, and the difference between the vehicle cabin temperature and the target temperature is reduced. Therefore, the target blowing air temperatures (TAOr) and (TAOl) are set low, so that they are shifted on the horizontal axis to the left.

Consequently, the mode selection point N moves from the point N4, passes through the point N3, and arrives at the point N5.

The position of selection point N5 is another threshold value point at which a changeover operation between the inside and outside air introduction modes is carried out. In the case where the target blowing air temperatures (TAOr) and (TAOl) cross the threshold value point S2 on the horizontal axis from the right to the left, the mode selection point is changed over from N5 to N6, so that the inside air introduction mode can be set.

When the mode is selected in the present invention, for example, the smaller one between the target blowing air temperatures (TAOr) and (TAOl) is employed so that the mode selection is conducted.

Figure 6:
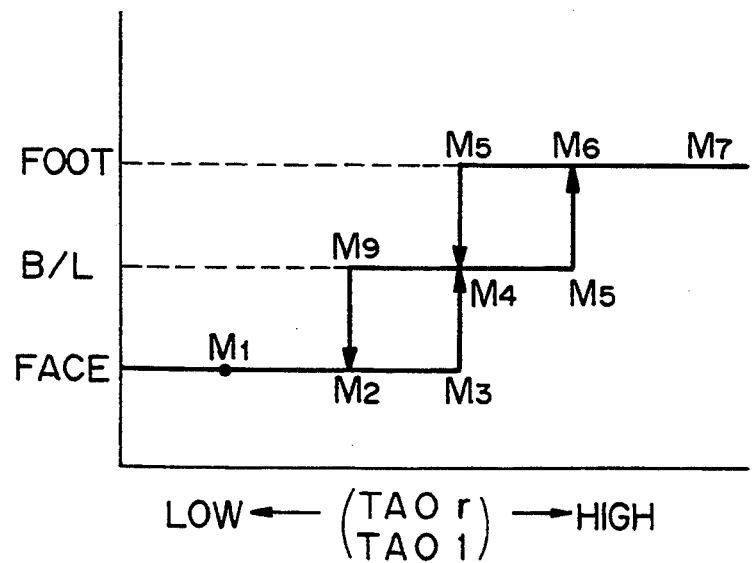
FIG. 6 is a correlation diagram of the target blowing air temperature (TAO) and the mode of blowing in the first example.

Next, in step 104, in accordance with the target temperatures TAOr, TAOl and the correlation shown in FIG. 6, it is determined whether the air blowing mode of each seat is set to be the foot mode (FOOT) or the high level mode (B/L), that is, the foot mode and the face mode are concurrently used, or it is determined whether or not the air blowing mode of each seat is set to be the face mode (FACE).

The mode selection control method shown in FIG. 6 is approximately the same as that shown in FIG. 5. The smaller one between the target blowing air temperatures TAOr and TAOl is employed for a reference value, and one of the foot, face and high level modes is selected in accordance with the level of TAOr or TAOl. In this case, the order of the selection is as follows. When the level of TAOr or TAOl is shifted from the left to the right, the selection mode point changes in the order of $M_1 \rightarrow M_2 \rightarrow M_3 \rightarrow M_4 \rightarrow M_5 \rightarrow M_6 \rightarrow M_7$. In the case where the order is reversed, the selection mode point changes in the order of $M_7 \rightarrow M_6 \rightarrow M_8 \rightarrow M_4 \rightarrow M_9 \rightarrow M_2 \rightarrow M_1$.

Figure 7:
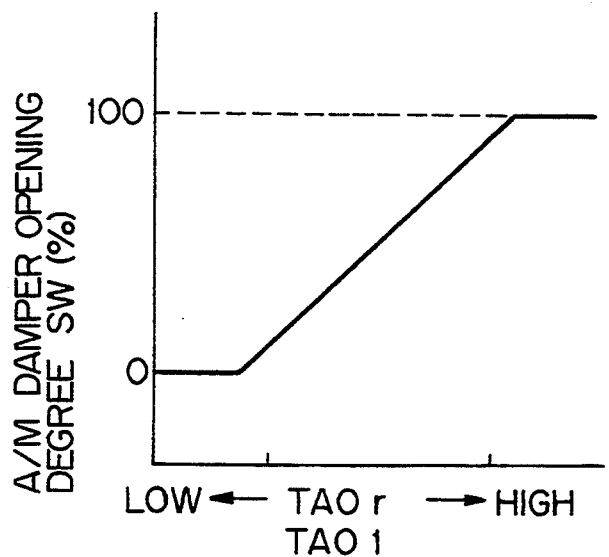
FIG. 7 is a correlation diagram of the target blowing air temperature (TAO) and the opening degree of each air mix damper.

Next, in step 105, in accordance with the target temperatures TAOr, TAOl and the correlation shown in FIG. 7, the degree of opening (SWr) of the air mix damper 15a and the degree of opening (SWl) of the air mix damper 15b are determined. The units of both SWr and SWl are %. In the first example, step 105 constructs the temperature adjustment control means.

The correlation between the target blowing air temperatures (TAOr), (TAOl) and the degree of opening SW of the air mix damper is to be previously found for a specific air conditioner for use in a vehicle through experiments, and the degree of opening SW of the air mix damper is set in the following manner. When the levels of the target blowing air temperatures (TAOr) and (TAOl) are low, the degree of opening SW of the air mix damper is low, and when the levels of the target blowing air temperatures (TAOr) and (TAOl) become high, the degree of opening SW of the air mix damper is increased in proportion to the levels.

In the correlation described above, when the degree of opening SW of the air mix damper is 0%, a complete cooling operation is to be carried out, and when the degree of opening SW of the air mix damper is 100%, a complete heating operation is to be carried out.

Next, in step 106, it is judged whether or not the only seated passenger is a driver. In this step, when other passengers except for the driver are seated, it is judged to be NO, and the program advances to step 114. When only the driver is seated, it is judged to be YES, and the program advances to step 107.

In step 107, it is judged whether or not the inside air circulation mode was determined in step 103 described above. In the case where it has been judged that the inside air circulation mode was not determined in step 103 (NO), the program advances to step 114, and in the case where the inside air circulation mode was determined in step 103 (YES), the program advances to step 108. In step 108, the air blowing mode on the passenger seat side determined in step 104 is canceled, and the foot mode is determined to be a new air blowing mode on the passenger seat side. In the first example, this step 108 composes the outlet changeover control means.

Next, in step 109, it is judged whether or not the compressor 27 is in a drive condition. In the first example, this step 109 composes the evaporator refrigerant flow detection means.

When it is judged in step 109 that the compressor 27 is in a drive condition (YES), that is, when it is judged that the refrigerant is flowing in the evaporator 23, the program advances to step 110, and the degree of opening (SWl) of the air mix damper 15b on the passenger seat side determined in step 105 is canceled, and a new degree of opening SWl is determined to be 0%. That is, the air blown out from the outlet on the passenger seat side is made to be in the maximum cooling condition. In the first example, this step 110 composes the heating amount minimizing control means.

In the case where it is judged in step 109 that the compressor 27 is not in a drive condition (NO), that is, in the case where it is judged in step 109 that the refrigerant is not flowing in the evaporator 23, the program advances to step 111.

In step 111, it is judged whether or not the air blowing mode on the driver's seat side determined in step 104 is the foot mode, that is, it is judged whether or not the driver's seat side is in a heating condition. When it is judged to be YES in step 111, SWl is determined to be 100% in step 112 so that the air blown out on the passenger's side can be in the maximum heating condition. In the case where it is judged to be NO in step 111, SW1 is determined to 0% in step 113 so that the air blown out on the passenger seat side can be in the maximum cooling condition. In the first example, step 111 composes the temperature adjustment condition detection means, and step 112 composes the second heating amount maximizing control means.

Figure 8:
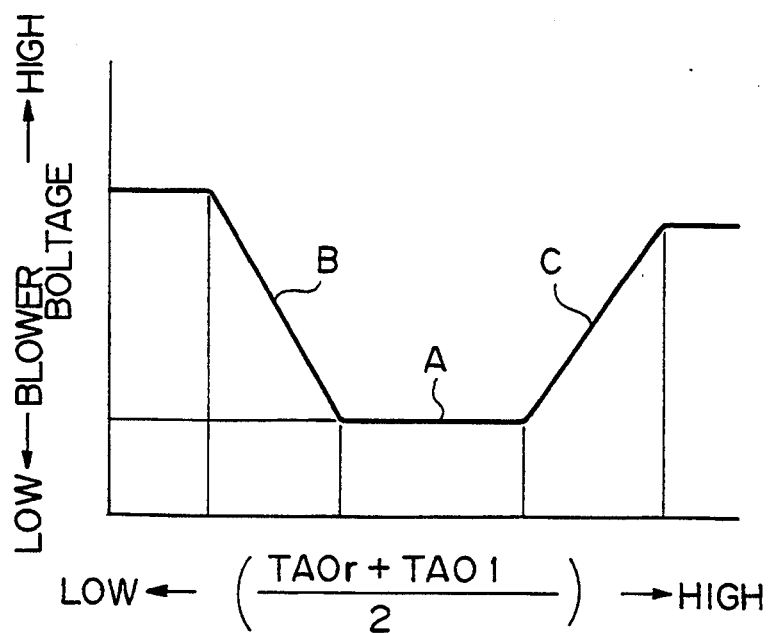
FIG. 8 is a correlation diagram of the target blowing air temperature (TAO) and the blower voltage in the first example.

Next, in step 114, in accordance with the average value of TAOr and TAOl calculated in step 102 and the correlation shown in FIG. 8, the voltage of the blower 22 is determined, so that the overall air flow amount is determined.

In the correlation shown in FIG. 8, the relation between the target blowing air temperatures (TAOr), (TAOl) and the blower voltage is to be previously found through experiments, and an example of the relation is shown in FIG. 8.

In this example, both the target blowing air temperatures (TAOr) and TAOl) are utilized, and the average value, that is, "target blowing air temperature (TAOr+TAOl)/2"

is used, so that the relation between the average value and the blower voltage is determined. As shown in the drawing, the region A in which the blower voltage is maintained constant is provided in a position close to the median of the average value, and the regions B and C in which the blower voltage is sharply changed are provided on both sides of the region A.

Next, in step 115, each motor controller and servo motor are controlled so that the inside and outside air mode, air blowing mode, degree of opening of each air mix damper and blower voltage can agree with the values determined in steps 103 to 114.

Next, the reasons will be described why the air blowing mode on the passenger seat side is newly determined to be the foot mode in step 108, and the degree of opening of the air mix damper 15b on the passenger seat side is newly determined to be 0% or 100% in steps 110 and 112.

In the case where only a driver is seated in the vehicle cabin, when the seats except for the driver's seat are air-conditioned, vacant seats are air-conditioned, so that energy is wasted. Therefore, it is preferable not to air-condition the vacant seats. However, when all outlets opposed to the vacant seats are closed and air-conditioning winds are stopped except for the winds to be blown against the driver's seat, only the spaces on the driver's seat side are air-conditioned, and other spaces are not air-conditioned at all. As a result, the average temperature on the vehicle cabin is changed. For example, the space on the driver's seat side is sufficiently cooled from the rays of the summer sun, however, the other spaces are heated by the rays of the sun. As a result, the average temperature in the vehicle cabin is raised. When the atmospheric temperature is very low in the winter, the space on the driver's seat side is sufficiently heated, however, the other spaces are cooled by the atmosphere. As a result, the average temperature in the vehicle cabin is lowered.

When the average temperature in the vehicle cabin is raised, the temperature of the upstream position of the air flow of the evaporator 23 is also raised. Then, a heavy cooling load is given to the evaporator 23. Therefore, power consumption of the compressor 27 is increased, and a heavy load is impressed upon the engine. As a result, fuel is wasted.

In order to overcome the above disadvantages, in the first example of the present invention, for the purpose of lowering the temperature in the upstream position of the air flow of the evaporator 23, the air blowing mode on the passenger seat side is forcibly made to be the foot mode in step 108, and the degree of opening (SW1) of the air mix damper 15b on the passenger seat side is set to be 0% in step 110. As a result of the foregoing, a cold wind blown out from the passenger seat lower outlet 11b that is open onto the passenger seat side, is sucked into the inside air entrance 25 located close to the outlet 11b without being circulated in the entire vehicle cabin. In this case, since the cold wind is not circulated in the entire vehicle cabin, it is not heated by the rays of the sun, and it is sucked into the inside air entrance 25 and further introduced into the upstream position of the air flow of the evaporator 23. Accordingly, the temperature of the upstream position of the air flow of the evaporator 23 can be lowered. Therefore, the difference of enthalpy of air before and after it passes through the evaporator 23 can be reduced, so that the cooling capacity of the evaporator 23 can be reduced. As a result, power consumption of the compressor 27 can be lowered, and finally a waste of fuel can be prevented.

In the case where the average temperature in the vehicle cabin is lowered, the temperature of the upstream position of the air flow of the evaporator 23 is also lowered. Under the condition that the refrigerant is not flowing in the evaporator 23 at this time, the temperature of air passing through the evaporator 23 is not changed. Therefore, when the temperature of the upstream position of the air flow of the evaporator 23 is lowered, the temperature of the upstream position of the air flow of the heater core 24 is also lowered. In the case where the driver's seat side is in a heating condition at this time, that is, in the case where air is heated by the heater core 24, the temperature of the upstream position of the air flow in the heater core 24 is lowered. Therefore, the heater core 24 requires a larger heating capacity. Then, in order to increase the heating capacity of the heater core 24, it is necessary to raise the temperature of engine cooling water by the method of idling the engine. Due to the foregoing, engine power is further consumed. As a result, fuel is wasted.

In order to overcome the above disadvantages, in the first example, for the purpose of raising the temperature of the upstream position of the air flow in the heater core 24, the air blowing mode on the passenger's side is forcibly made to be the foot mode in step 108, and the degree of opening (SW1) of the air mix damper 15b on the passenger seat side is made to be 100% in step 112. Due to the foregoing, a hot wind is blown from the passenger seat lower outlet 11b open onto the passenger seat side. Without being circulated in the entire vehicle cabin, this hot wind is sucked into the inside air entrance 25 located very close to the outlet 11b. Since the hot wind is not circulated in the entire vehicle cabin in this case, it is not cooled by the atmosphere of low temperature, and it is sucked into the inside air entrance 25 while still at a high temperature. Then, the hot wind is introduced to the upstream position of the air flow in the evaporator 23. Since the refrigerant is not flowing in the evaporator 23 at this time, the hot wind is introduced to the upstream position of the air flow in the heater core 24 under the same condition. Due to the foregoing, the temperature of the upstream position of the air flow in the heater core 24 can be reduced. Therefore, the difference of the temperature of air before and after it passes through the heater core 24 can be reduced, so that the heating capacity of the heater core 24 can be reduced. As a result, it is not necessary to conduct an idling operation of the engine. Accordingly, power consumption of the engine can be reduced, and finally a waste of fuel can be prevented.

Figure 9:
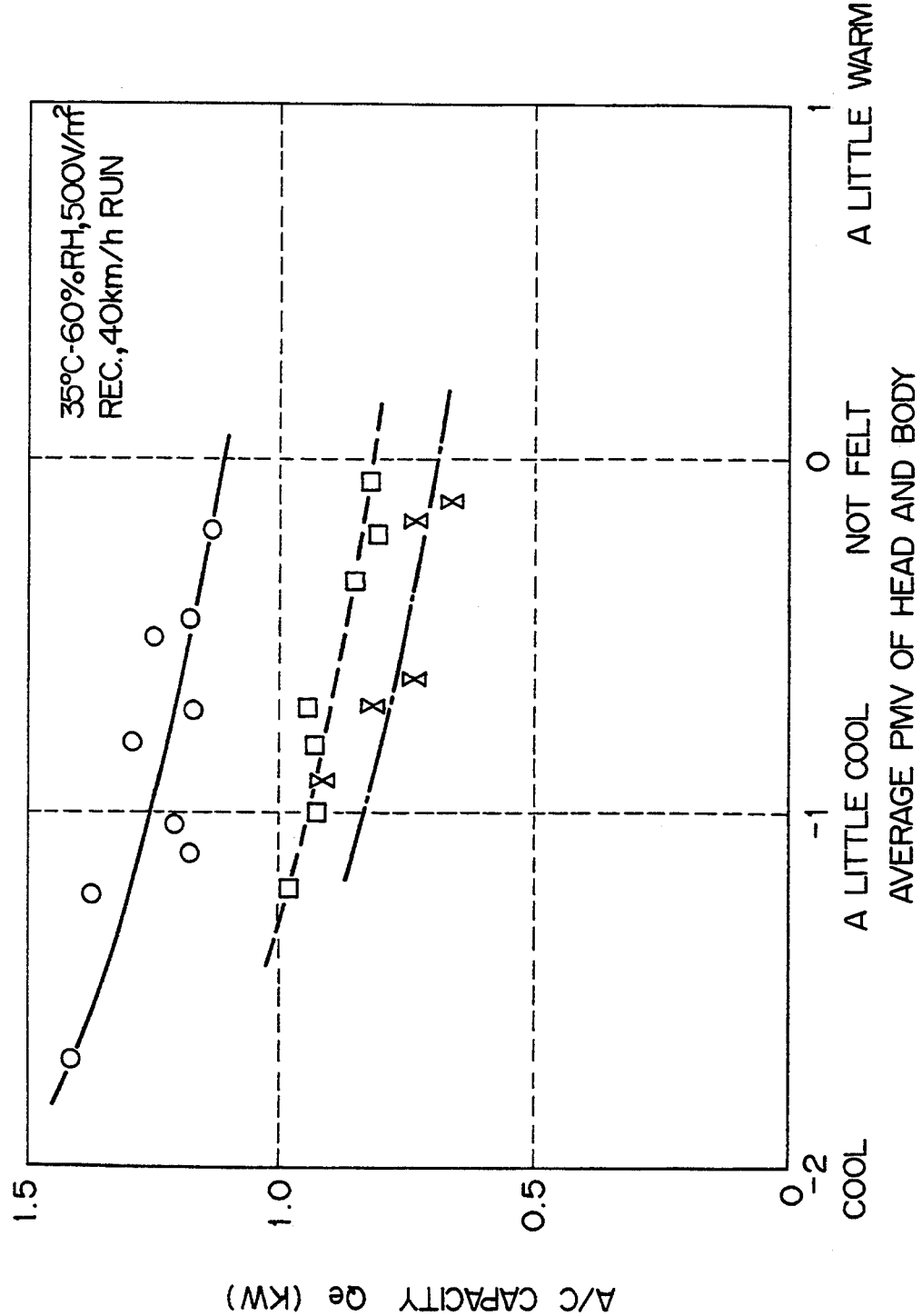
FIG. 9 is a graph showing a correlation between the comfort index (PMV) and the refrigerating capacity in the first example and a conventional example.

Next, with reference to FIG. 9, specific effects of the first example will be explained as follows. FIG. 9 is a correlation diagram showing the cooling capacity (Qe) of the evaporator 23 with respect to the average value of the comfort index (PMV), wherein the comfort index around the driver's head and that around the driver's body are averaged. In this connection, the cooling capacity (Qe) of the evaporator 23 is in proportion to a flow amount of a wind passing through the evaporator 23 and also in proportion to a difference of enthalpy of air before and after it passes through the evaporator 23, and in inverse proportion to the specific volume of air.

In this connection, in FIG. 9, a solid line represents the data provided when each seat was air-conditioned in the inside air circulation mode, a broken line represents the data provided when conditioned air was blown out only from the outlet on the driver's seat side and the outlet on the passenger seat side was closed in the inside air circulation mode, and a one-dotted chain line represents the data provided when the driver's seat side was normally air-conditioned in the inside air circulation mode and the passenger seat side was set in the foot mode.

As can be seen from FIG. 9, when the air conditioning control operation is conducted in the manner shown in the first example, the cooling load can be greatly reduced as compared with a conventional case. As a result, power consumption of the compressor 27 can be reduced. Finally, fuel consumption of the engine can be reduced.

As described above, in the first example, only the driver is seated, and the inside and outside air mode is set to be the inside air circulation mode, and while the refrigerant is flowing in the evaporator 23, the air blowing mode on the passenger seat side is forcibly set in the foot mode and the degree of opening of the air mix damper 15b on the passenger seat side is forcibly set at 0%. Accordingly, a cold wind blown out from the passenger seat lower outlet 11b can be immediately sucked into the inside air entrance 25, so that the temperature of the upstream position of the air flow in the evaporator 23 can be lowered. As a result, power consumption of the compressor 27 can be reduced, and the reduction of fuel consumption of the engine can be realized.

In the first example, only the driver is seated, and the inside and outside air mode is set to be the inside air circulation mode, and while the refrigerant is not flowing in the evaporator 23 and the driver's seat side is in the heating mode, the air blowing mode on the passenger seat side is forcibly set to be the foot mode and the degree of opening of the air mix damper 15b on the passenger seat side is forcibly set at 100%. Accordingly, a hot wind blown out from the passenger seat lower outlet 11b can be immediately sucked into the inside air entrance 25, so that the temperature in the upstream position of the air flow in the heater core 24 can be raised. As a result, the heating capacity of the heater core 24 can be lowered, so that the reduction of fuel consumption of the engine can be realized.

In the aforementioned first example, when only the driver is seated and the mode is set to be the inside air circulation mode, the air blowing mode on the passenger seat side is forcibly set to be the foot mode. However, the air blowing mode on the passenger seat side may be set to be the high level mode. In this case, a conditioned wind is blown out from the passenger seat side lower outlet 11b, and this wind is immediately sucked into the inside air entrance 25. Therefore, the air conditioning load of the evaporator 23 or the heater core 24 can be reduced.

In the first example, the seating detection means is composed of the passenger sensor, however, the seating detection means may be composed of a passenger switch by which the number of passengers can be manually set.

In the first example, the temperature adjustment means is composed of the air mix dampers 15a, 15b. However, the temperature adjustment means may be composed of a reheat type device in which the heater core is provided in each of the air conditioning systems 1A, 1B, and a flow amount of or temperature of the engine cooling water flowing in these heater cores is independently adjusted.

Figure 4:
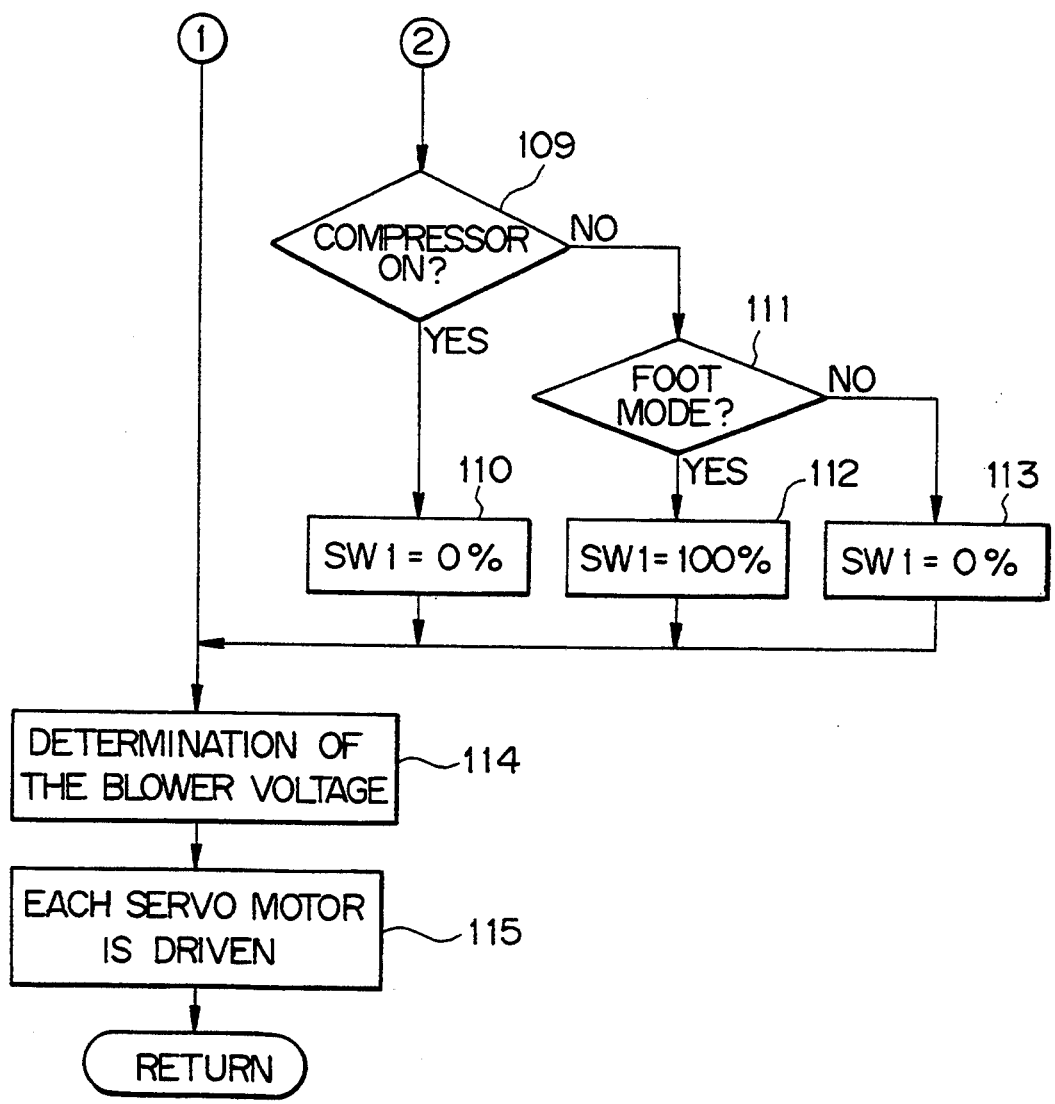
FIG. 4 is a flowchart showing the procedure of air conditioning control of the first example.

In the first example, whether or not the temperature adjustment means (the air mix damper 15b) provided in the driver's seat side air conditioning system 1A is in a heating condition, is judged by the air blowing mode on the driver's seat side as shown in step 111 in FIG. 4, that is, it is judged by whether or not the air blowing mode is the foot mode. However, it may be judged by whether or not the air mix damper 15b opens the heater core 24 by a predetermined degree of opening. Alternatively, it may be judged by whether or not the target air blowing temperature (TAOr) is not less than a predetermined temperature.

In the first example of the present invention described above, the following various embodiments may be used.

For example, in the air conditioner for use in a vehicle of the first example of the present invention, the air duct 19 includes a plurality of air ducts 1A, 1B for each seat provided in the downstream position of the air flow of the evaporator, the most downstream portions of the air ducts 1A, 1B are connected with outlets 11a, 11b, 12a, 13a, 12b, 13b, 14b open at positions opposed to each seat, and air ducts 1A, 1B are provided with a heater 24 to heat air and temperature adjustment means 15a, 15b to adjust the heating amount of the heater, and the air conditioner further comprises: a temperature adjustment control means to independently control the temperature adjustment means so as to heat each seat to a predetermined temperature; an evaporator refrigerant flow detection means to detect whether or not the refrigerant flows in the evaporator 23; and a heating amount minimizing control means to control the temperature adjustment control means so that an air heating amount of the heater provided in the air duct for each seat connected with an outlet closest to the inside air entrance can be minimized in the case where it is judged by the seating detection means that only one passenger is seated and also it is judged by the evaporator refrigerant flow detection means that the refrigerant is flowing in the evaporator.

In this case, a condition in which the air heating amount is minimized is not defined as a condition in which the heating amount is perfectly zero, but the condition may be defined as a condition in which air is heated to some extent.

Also, in the first example and another embodiment described above according to the present invention, the inside air entrance 25 is open to the passenger seat side; the plurality of outlets 11 to 13 include driver's seat upper outlets 12a, 13a open at a position opposed to the upper portion of the driver's seat, a driver's seat lower outlet 11a open at a position opposed to the lower portion of the driver's seat, passenger seat upper outlets 13b, 12b open at a position opposed to the upper portion of the passenger seat, and a passenger seat lower outlet 11b open at a position opposed to the lower portion of the passenger seat; and the outlet changeover control means 16, 17 control the outlet changeover means so that an outlet close to the inside air entrance 25, the outlet being one of the passenger seat upper outlets 12b, 13b and the passenger seat lower outlet 11b, is opened while the opening conditions of the driver's seat upper outlets 12a, 13a and driver's seat lower outlet 11a are not changed in the case where it is judged that only a driver is seated.

In the air conditioner for use in a vehicle in the examples described above, the inside air entrance 25 may be open at a lower position on the passenger seat side, and the outlet changeover means 16, 17 are controlled so that the passenger seat lower outlet 11b is opened while the opening conditions of the driver's seat upper outlets 12a, 13a and the driver's seat lower outlet 11a are not changed in the case where it is judged that only a driver is seated.

In the air conditioner for use in a vehicle in the examples described above, the inside air entrance 25 is open at a lower position 11b on the passenger seat side, and the outlet changeover control means 16, 17 are controlled so that the passenger seat upper outlets 12b, 13b and the passenger seat lower outlet 11b are opened while the opening conditions of the driver's seat upper outlets 12a, 13a and the driver's seat lower outlet 11a are not changed in the case where it is judged that only a driver is seated.

In the air conditioner for use in a vehicle in the examples described above, the heater 24 may be a condenser composing a refrigerating cycle together with the evaporator, and the air conditioner comprises: a temperature adjustment condition detection means to detect the temperature adjustment condition of the temperature adjustment means; and a first heating amount maximizing control means that controls the temperature adjustment control means so that an air heating amount of the condenser is maximized, the condenser being provided in the air duct for each seat connected with an outlet disposed closest to the inside air entrance in the case where it is judged that only one passenger is seated, that the refrigerant is not flowing in the evaporator, and that a temperature adjustment means provided in an air duct for each seat on the side where the passenger is seated is in a heating condition, in accordance with the detection results of the seating detection means, the evaporator refrigerant flow detection means, and the temperature adjustment condition detection means.

In the air conditioner for use in a vehicle in the examples described above, the heater 24 may be a heater core, the heat source of which is engine cooling water to cool the engine, and the air conditioner comprises: a temperature adjustment condition detection means to detect the temperature adjustment condition of the temperature adjustment means 15; and a second heating amount maximizing control means that controls the temperature adjustment control means so that an air heating amount of the heater core 24 is maximized, the heater core 24 being provided in the air duct 19 for each seat connected with an outlet disposed closest to the inside air entrance 25 in the case where it is judged that only one passenger is seated, that the refrigerant is not flowing in the evaporator, and that a temperature adjustment means 15 provided in an air duct for each seat on the side where the passenger is seated is in a heating condition, in accordance with the detection results of the seating detection means, the evaporator refrigerant flow detection means, and the temperature adjustment condition detection means.

In the examples of the present invention described above, a condition in which the temperature adjustment means 15 provided in the air duct for each seat is in a heating condition is defined as a condition in which the air in the duct for each seat is heated by the condenser 28 or the heater core 24 even when the heating amount is little. In the examples of the present invention described above, a condition in which the air heating amount is the maximum is defined not only as a condition in which air is heated by the condenser or the heater to its full capacity but also as a condition in which the heating capacity is a little lower than that.

Further, in the present invention, the air ducts 1A, 1B for each seat are respectively provided with the heater 24 and the temperature adjustment means 15, and the temperature adjustment control means independently controls each temperature adjustment means so as to control the temperature of each seat to a predetermined value. Therefore, the temperature of blowing air to each seat can be independently controlled.

In this connection, when only one passenger is seated in the vehicle cabin and the refrigerant is flowing in the evaporator at this time, the heating amount minimizing control means controls the temperature adjustment control means so that the air heating amount of the heater provided in the air duct for each seat connected with the outlet closest to the inside air entrance can be minimized.

The outlet changeover control means 15 controls the outlet changeover means in order to open the outlet that is open at a position opposed to a seat where a passenger is seated and the outlet closest to the inside air entrance 25.

By the controlling operation conducted by the heating amount minimizing control means and the outlet changeover control means, air is blown out to the passenger after the temperature has been controlled by the temperature control means, so that the passenger feels comfortable in the conditioned air. A cold wind is blown out from the outlet located closest to the inside air entrance, and this cold wind is immediately sucked into the inside air entrance without being circulated in the entire cabin. Accordingly, the temperature of air at the upstream position of the air flow in the evaporator can be lowered.

In this connection, when the refrigerant is flowing in the evaporator, air must be cooled by the evaporator. When the temperature of air in the upstream position of the evaporator is lowered at this time by the heating amount minimizing control means and the blowing air amount control means, the difference of enthalpy of air before and after it passes through the evaporator can be reduced. As a result, the cooling load of the evaporator can be reduced. Consequently, the power consumption of the compressor can be reduced.

On the other hand, in the present invention, in the case where only a driver is seated in his seat, the opening conditions of the driver's seat upper outlets 12a, 13a and the driver's seat lower outlet 11a are not changed by the control of the outlet changeover control means 15. Therefore, a comfortable wind can be continuously blown out to the driver as it is.

In the case where only the driver is seated, the outlet changeover control means 15 controls the outlet changeover means 15 so that one of the passenger seat upper outlets 12b, 13b and the passenger seat lower outlet 11b, which is located closer to the inside air entrance 25, can be opened. That is, the control operation is conducted to control the outlet changeover means in the following manner. In the case where the passenger seat upper outlets 12b, 13b are located closer to the inside air entrance 25, conditioned air is blown out from the passenger seat upper outlets 12b, 13b, and in the case where the passenger seat lower outlet 11b is located closer to the inside air entrance 25, conditioned air is blown out from the passenger seat lower outlet 11b.

When the refrigerant is flowing in the evaporator at this point of time, a cold wind can be blown out from an outlet located at a position closest to the inside air entrance 25 as described above. Therefore, the temperature of air in the upstream position of the air flow in the evaporator 23 can be lowered, so that the difference of enthalpy of air between the upstream and downstream positions can be reduced. As a result, the power consumption of the compressor can be reduced.

Further, according to the present invention, the temperature of air blowing to each seat can be independently controlled. In the present invention, the heater 24 is composed of a condenser that composes a refrigerating cycle together with the evaporator 23.

According to the present invention, in the case where only one passenger is seated in the cabin, the refrigerant is not flowing in the the evaporator 23, and the temperature of air in the air duct 19 communicated with a seat where the passenger is seated is heated by the condenser 28 even when the heating amount is small, it is preferable that a control means is provided which controls the temperature adjustment control means so that the heating amount of air can be maximized when the air is heated by the condenser provided in the air duct for each seat connected with the outlet located closest to the inside air entrance. This control means will be referred to as a first heating amount maximizing control means.

The outlet changeover control means 15 controls the outlet changeover means so that the outlet open at a position opposed to a seat where the passenger is seated, and the outlet located at a position closest to the inside air entrance 25 can be opened.

When the air conditioning operation is controlled by the first heating amount maximizing control means and the outlet changeover control means, an air-conditioned wind, the temperature of which is controlled by the temperature adjustment means, is blown out to the passenger, so that he feels comfortable. Further, a hot wind is blown out from the outlet located at a position closest to the inside air entrance, and further this hot wind is immediately sucked into the inside air entrance without being circulated in the entire vehicle cabin.

When a hot wind is immediately sucked into the inside air entrance without being circulated in the entire cabin, this hot wind is sucked into the air duct through the inside air entrance without being affected by the cold outside air. Due to the foregoing, the temperature of air in the upstream position of the evaporator can be raised.

In this connection, when the refrigerant is not flowing in the evaporator 23, the temperature of air on the upstream side of the evaporator is not changed even when it passes through the evaporator. That is, the air on the upstream side of the evaporator is guided to the upstream position of the air flow of the condenser while the temperature of the air is maintained.

When the temperature of air in the upstream position of the air flow in the evaporator is raised at this point of time by the control of the first heating amount maximizing means and the outlet changeover means, the temperature of the upstream position of the air flow in the condenser can be concurrently raised. Therefore, the difference of temperature of air before and after it passes through the condenser can be reduced. As a result, the power consumption of the compressor can be reduced.

According to the present invention, in the same manner as the examples described above, the temperature of air blown out to each seat can be independently controlled. In this case, the heater 22 is composed of a heater core in which cooling water of the engine is used as a heat source.

According to the present invention, in the case where only one passenger is seated in the cabin, the refrigerant is not flowing in the evaporator, and the temperature of air in the air duct communicated with a seat where the passenger is seated is heated by the heater core even when the heating amount is small, it is preferable that a control means is provided which controls the temperature adjustment control means so that the heating amount of air can be maximized when the air is heated by the heater core 24 provided in the air duct 25 for each seat connected with the outlet located closest to the inside air entrance. This control means will be referred to as a second heating amount maximizing control means.

The outlet changeover control means controls the outlet changeover means so that the outlet open at a position opposed to a seat where the passenger is seated and the outlet located at a position closest to the inside air entrance can be opened.

When the air conditioning operation is controlled by the heating amount maximizing control means and the outlet changeover control means, an air-conditioned wind, the temperature of which is controlled by the temperature adjustment means, is blown out to the passenger, so that the passenger feels comfortable. Further, a hot wind is blown out from the outlet located at a position closest to the inside air entrance, and further this hot wind is immediately sucked into the inside air entrance without being circulated in the entire cabin. As a result, the difference of temperature of air before and after it passes through the heater core can be reduced. Therefore, the heating capacity of the heater core can be reduced.

When the heating capacity of the heater is reduced, the calorific value of the engine can be reduced. When the calorific value of the engine is low, for example, it is not necessary to facilitate the generation of heat of the engine by increasing the engine speed. As a result, the fuel consumption of the engine can be reduced.

Next, the second example will be explained in which the present invention is applied to an air conditioner for use in an electric automobile.

Figure 10:
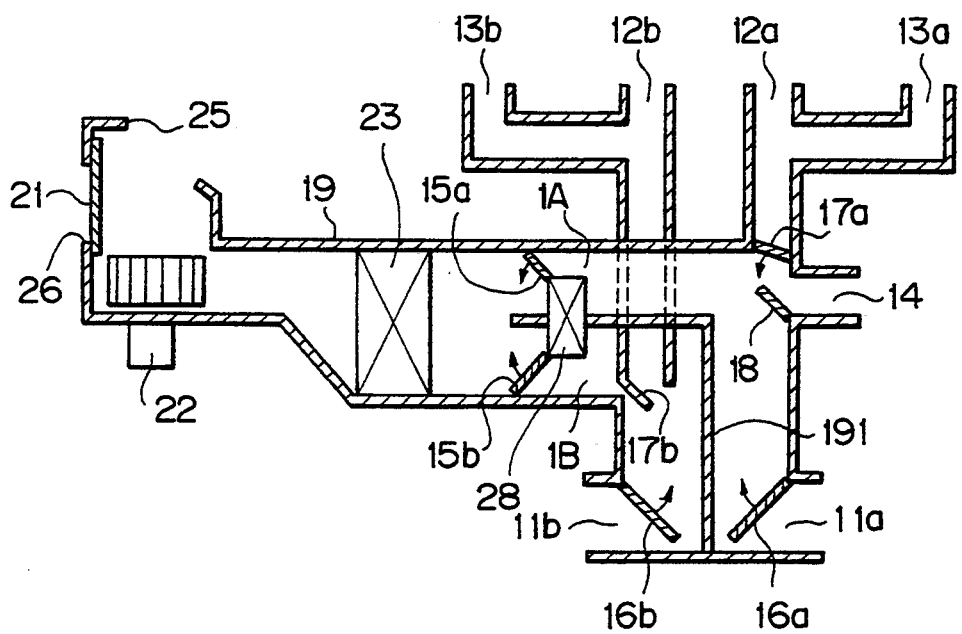
FIG. 10 is an overall arrangement view of the air duct system of the second example of the present invention.

As the overall arrangement of the second example is shown in FIG. 10, the evaporator 23 is disposed in the air duct 19, and the condenser 28 composing a refrigerating cycle together with the evaporator 23 is disposed in the downstream position of the air flow of the evaporator 23. In the first example, this condenser 28 is disposed outside the air duct 19, however, in the second example, this condenser 28 is disposed in the air duct 19 so as to form a heater.

Figure 11:
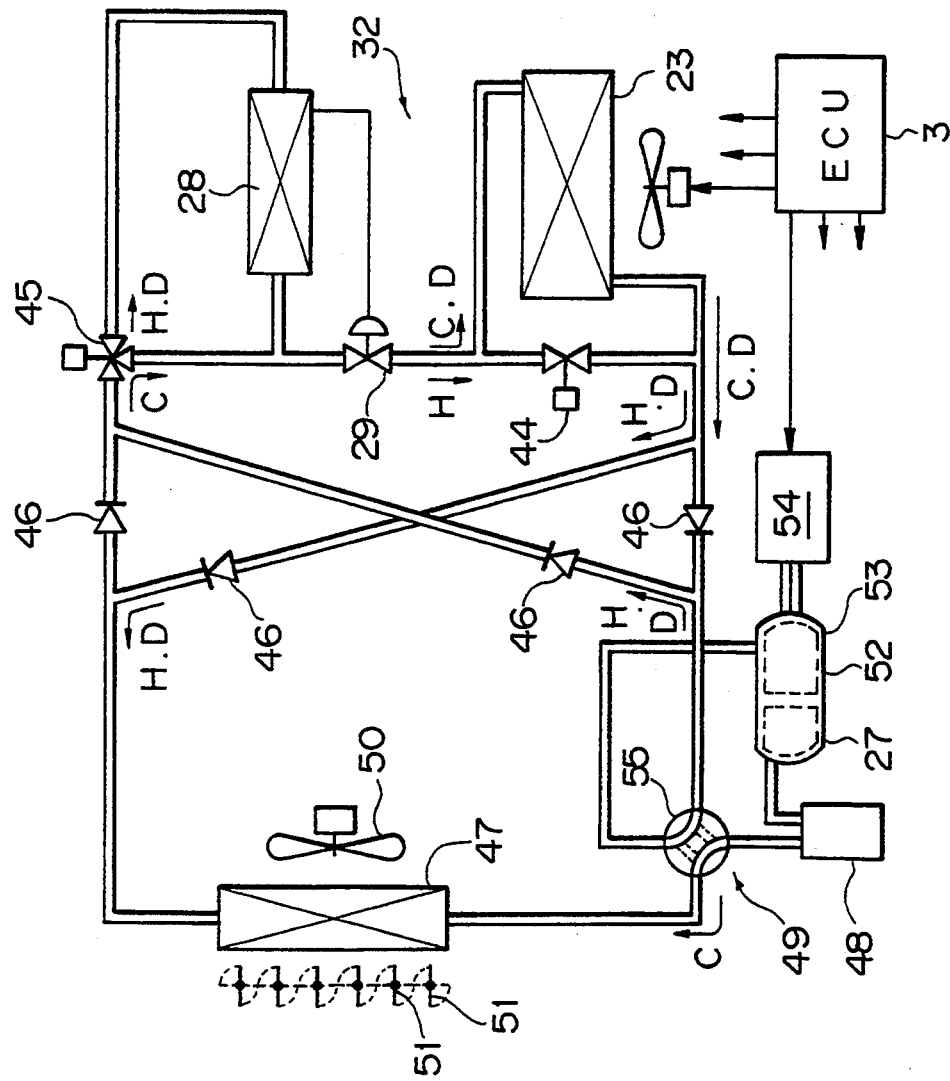
FIG. 11 is a schematic illustration showing the construction of the refrigerating cycle used for the second example.

Next, with reference to FIG. 11, a refrigerating cycle of the second example will be explained as follows. The refrigerating cycle of the second example is an accumulator cycle.

The refrigerating cycle includes the evaporator 23, condenser 28, outside heat exchanger 47, compressor 27, expansion valve 29, accumulator 48, and flow passage changeover means 49 to change the direction of the flow of the refrigerant.

The outside heat exchanger 47 is an exchanger for exchanging heat between the outside air and the refrigerant, and provided with an outside fan 50 and an outside air shutter 51. The compressor 27 sucks, compresses and discharges the refrigerant, and is driven by a motor 52. This compressor 27 is disposed in a sealed case 53 integrally with the motor 52. The motor 52 driving the compressor 27 is controlled by an inverter 54, so that the rotation of the motor 52 can be varied. When the rotational speed of the motor 52 is varied, the refrigerant discharge capacity of the compressor 27 can be changed.

The expansion valve 29 is a valve that decompresses and expands the refrigerant flowing into the evaporator 23. For example, in a dehumidifying operation, a supercooling amount of the condenser 28 is adjusted by the expansion valve 29.

A refrigerant passage changeover means 49 changes over the passage of the refrigerant in accordance with the operational modes of cooling, heating and dehumidifying. Specifically, this passage changeover means 49 includes: a four-way valve 55 that changes over the discharging direction of the compressor 27 between the direction of the outside heat exchanger 47 and that of the condenser 28; an electromagnetic valve 44 bypassing the evaporator 23 in a heating operation; an electromagnetic three-way valve 45 bypassing the condenser 28 in a cooling operation; and a check valve 46 regulating the direction of the refrigerant flow.

The passage changeover means 49 changes over the flow of the refrigerant as follows in accordance with the operational modes of cooling, heating and dehumidifying.

For example, in a cooling operation, the refrigerant discharged from the compressor 27 is allowed to flow in the order of the four-way valve 55 → outside heat exchanger 47 → bypassing the condenser 28 → expansion valve 29 → evaporator 23 → four-way valve 55 → accumulator 48 → compressor 27. (This order is indicated by arrow C in the drawing.)

In a heating operation, the refrigerant discharged from the compressor 27 is allowed to flow in the order of the four-way valve 55 → condenser 28 → expansion valve 29 → bypassing the evaporator 23 → outside heat exchanger 47 (the outside fan 50 is turned on, and the outside air shutter 51 is opened.) → four-way valve 55 → accumulator 48 → compressor 27. (This order is indicated by arrow H in the drawing.)

In a dehumidifying operation, the refrigerant discharged from the compressor 27 is allowed to flow in the order of the four-way valve 55 → condenser 28 → expansion valve 29 → evaporator 23 → outside heat exchanger 47 (the outside fan 50 is turned off, and the outside air shutter 51 is closed.) → four-way valve 55 → accumulator 48 → compressor 27. (This order is indicated by arrow D in the drawing.)

Figure 12:
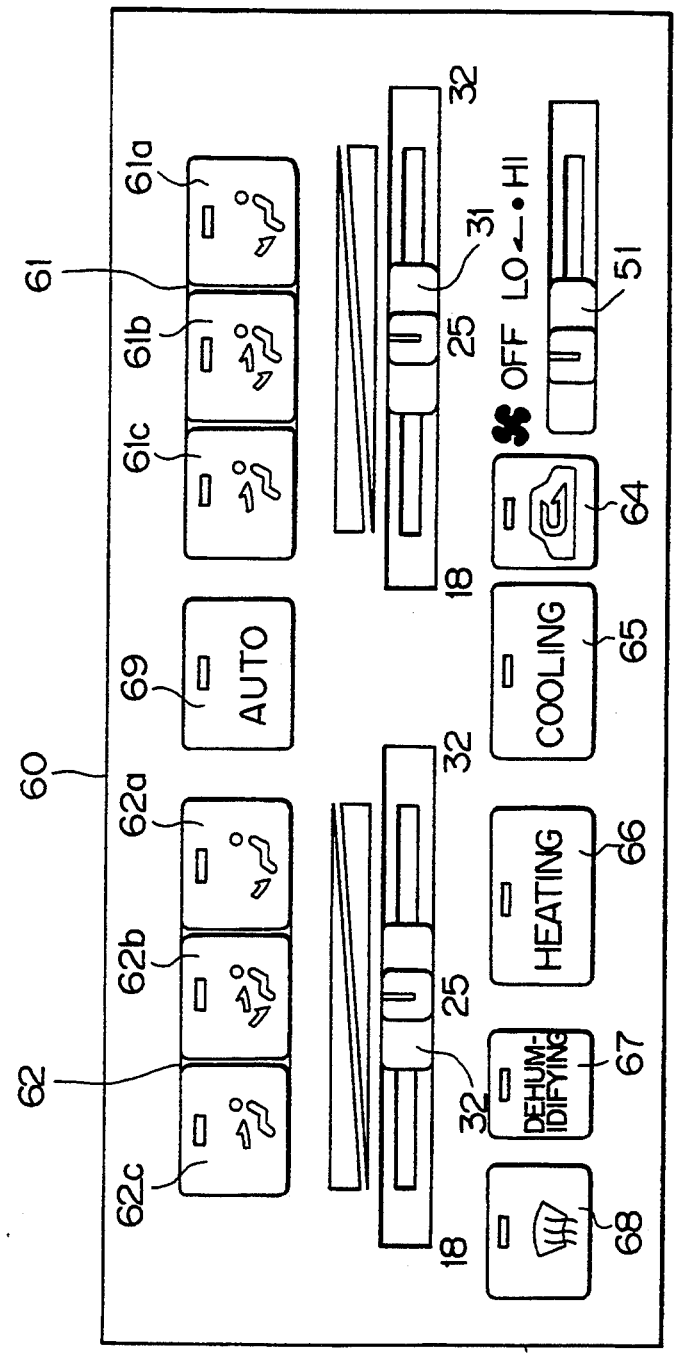
FIG. 12 is a front view of the control panel used for the second example.

Next, with reference to FIG. 12, a control panel 60 used in the second example will be explained as follows.

The operation panel 60 is disposed at a maneuverable position in the vehicle cabin. In the right upper portion of the operation panel 60 in the drawing, there is provided a driver's seat side air blowing mode changeover switch 61 through which a driver can manually set the air blowing mode on the driver's seat side, and in the left upper portion of the operation panel 60 in the drawing, there is provided an passenger seat side air blowing mode changeover switch 62 through which the passenger can manually set the air blowing mode on the passenger seat side. In the case of the second example, when an ignition key is turned on, the inside air mode, air blowing mode and temperature of blowing air are automatically controlled. However, when the air blowing mode changeover switches 61, 62 are pressed, the aforementioned automatically controlled conditions are released, so that the air blowing mode is changed to the manually controlled condition.

Specifically, when the switches 61a, 61b, 61c are pressed, the foot, high level and face modes can be set on the driver's seat side. Also, when the switches 62a, 62b, 62c are pressed, the foot, high level and face modes can be set on the passenger seat side.

In the lower position of the driver's seat side air blowing mode changeover switch 61, there is provided a driver's seat side temperature setting device 31 by which the temperature of air blown onto the driver's seat side can be manually set. Also, in the lower position of the passenger seat side air blowing mode changeover switch 62, there is provided a passenger seat side temperature setting device 32 by which the temperature of air blown onto the passenger seat side can be manually set.

In the lower position of the driver's seat side temperature setting device 31 in the drawing, there is provided an air flow amount setting switch 51 for manually adjusting an amount of air blown out into the vehicle cabin.

On the left of the air flow amount setting switch 51 in the drawing, there is provided an inside and outside air changeover switch 64 that changes over between the inside and outside air circulation modes when a command signal is given to the inside and outside air changeover damper 21. When this inside and outside air changeover switch 64 is pressed, the inside air circulation mode is commanded, and when the inside and outside air changeover switch 64 is not pressed, the outside air introduction mode is commanded.

On the left of the inside and outside air changeover switch 64, there is provided a cooling switch 65. When this cooling switch 65 is pressed, a control signal is output to the passage changeover means 49 (shown in FIG. 11) so that the refrigerant can flow in the refrigerating cycle in accordance with the cooling operation flow shown by arrow C in FIG. 11.

On the left of the cooling switch 65 in the drawing, there is provided a heating switch 66. When this heating switch 66 is pressed, a control signal is output to the passage changeover means 49 (shown in FIG. 11) so that the refrigerant can flow in the refrigerating cycle in accordance with the heating operation flow shown by arrow H in FIG. 11.

On the left of the heating switch 66 in the drawing, there is provided a dehumidifying switch 67. When this dehumidifying switch 67 is pressed, a control signal is outputted to the passage changeover means 49 (shown in FIG. 11) so that the refrigerant can flow in the refrigerating cycle in accordance with the dehumidifying operation flow shown by arrow D in FIG. 11. In this connection, even when this dehumidifying switch 67 is pressed, the air blowing mode and temperature are not changed.

On the left of the dehumidifying switch 67 in the drawing, there is provided a defroster switch 68. When this defroster switch 68 is pressed, a control signal is outputted so that both the driver's seat side air blowing mode and the passenger seat side air blowing mode are forcibly set to be a defroster mode.

In the upper center of the control panel 60 in the drawing, there is provided an automatic switch 69. When this automatic switch 69 is pressed, the air blowing mode, blowing air temperature and blowing air flow amount can be returned to the automatic control condition.

Next, with reference to FIGS. 3 and 13, an operation of the second example will be explained as follows.

First, the control operations of steps 101 to 108 (shown in FIG. 3) of the first example described above are carried out. Due to the foregoing, the target blowing air temperatures (TAOr, TAOl) are calculated, the inside and outside air mode is determined, the air blowing mode is determined, and the degrees of opening (SWr, SWl) of the air mix dampers 15a, 15b are determined. In the case where it is the inside air circulation mode in which only the driver is seated, the air blowing mode on the passenger seat side is determined to be the foot mode.

Figure 13:
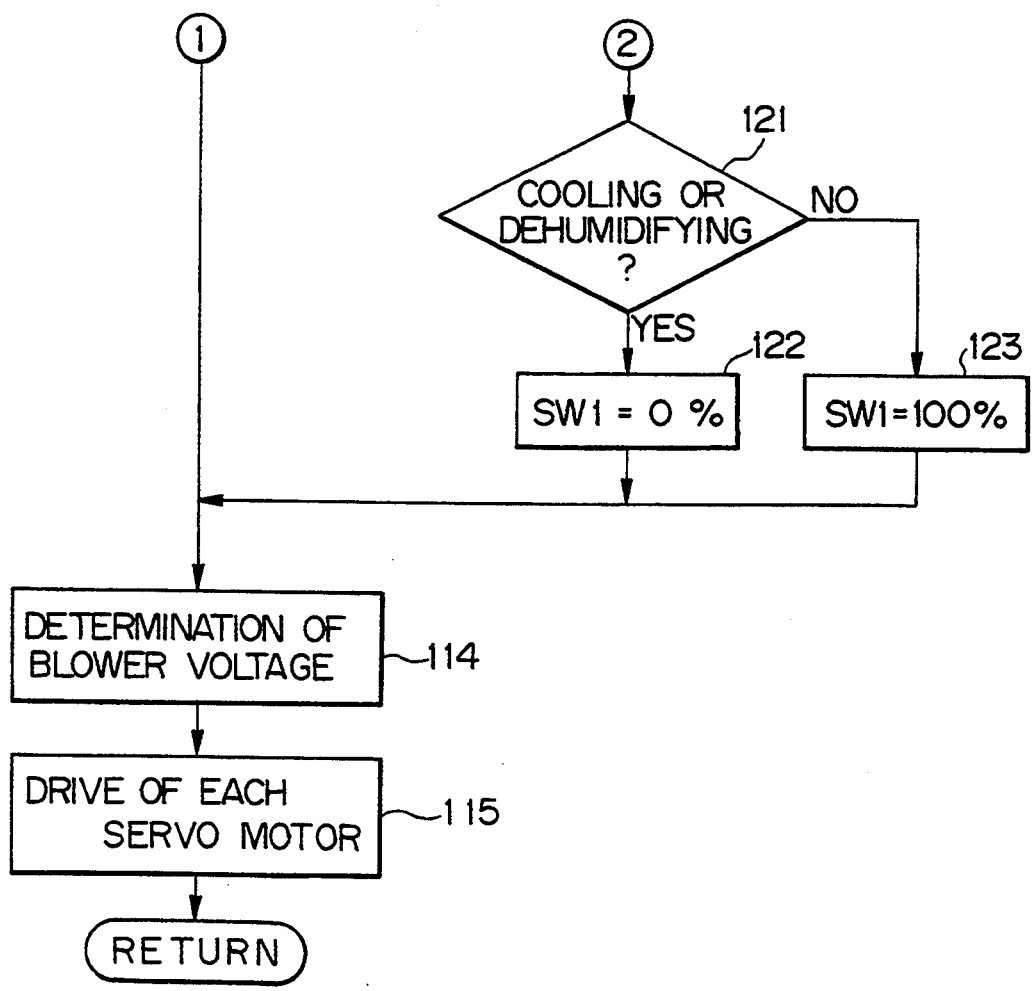
FIG. 13 is a flowchart showing the procedure of air conditioning of the second example.

In the case where it is judged to be NO in step 106, the program advances to step 114 in FIG. 13. In the case where the control operation shown in step 108 has been carried out, the program advances to step 121 shown in FIG. 13. In the second example, this step 121 composes the evaporator refrigerant flow detection means and the temperature adjustment condition detection means.

Figure 14:
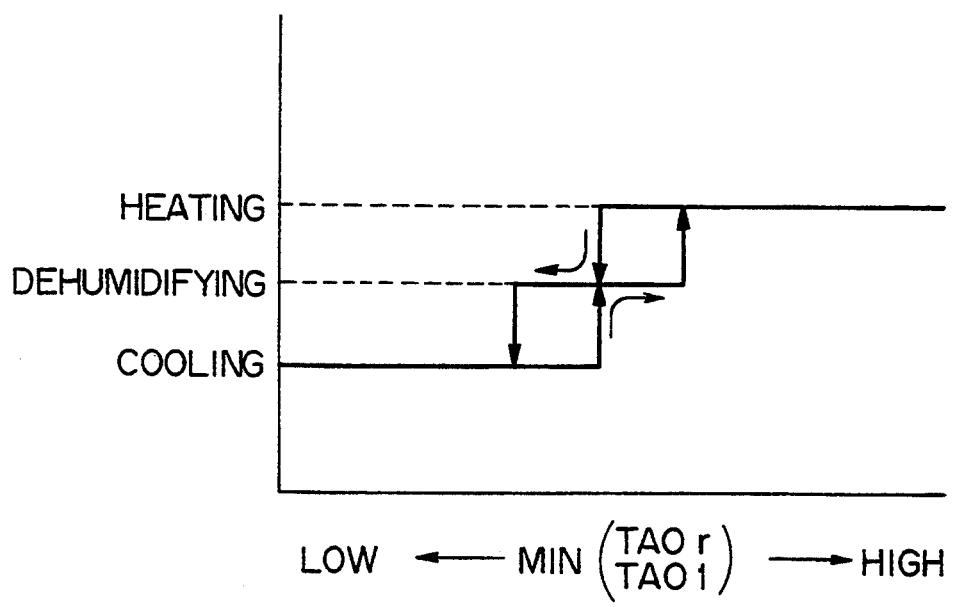
FIG. 14 is a correlation diagram of the target blowing air temperature (TAO) and the mode of cooling and heating in the second example.

In step 121, it is judged whether or not the refrigerant is flowing in the evaporator 23. That is, it is judged whether the refrigerant flow in the refrigerating cycle is in the direction of C or D in FIG. 11. Specifically, in the case where a mode that has been determined from the smaller one of TAOr and TAOl calculated in step 102 and the correlation shown in FIG. 14, is the cooling mode or the dehumidifying mode, it is judged to be YES, and the program advances to step 122. In this case, the refrigerant in the refrigerating cycle flows in the direction of arrow C or D shown in FIG. 11. In the case where a mode that has been determined from the smaller one of TAOr and TAOl, and the correlation shown in FIG. 14, is the heating mode, it is judged to be NO, and the program advances to step 123. In this case, the refrigerant in the refrigerating cycle flows in the direction of arrow H in FIG. 11.

In the case where either the cooling switch 65, heating switch 66 or dehumidifying switch 67 is pressed, judgment of step 121 is conducted while priority is given to the condition input by the switch rather than the mode determined by the correlation (shown in FIG. 14). That is, even when the heating mode is determined by the correlation shown in FIG. 14, it is determined to be YES in step 121 in the case where either the cooling switch 65 or the dehumidifying switch 67 is pressed. In this case, the refrigerant in the refrigerating cycle flows in the direction of arrow C or D shown in FIG. 11. Even in the case where the cooling mode or dehumidifying mode is determined by the correlation shown in FIG. 14, it is judged to be NO in step 121 when the heating switch 66 is pressed. In this case, the refrigerant in the refrigerating cycle flows in the direction of arrow H shown in FIG. 11. In this connection, mode selection judgment is conducted using the program shown in FIG. 14 in the same manner as the programs shown in FIGS. 5 and 6.

In the case where it is judged to be YES in step 121, that is, in the case where the refrigerant is flowing in the evaporator 23, air is cooled by the evaporator 23 although the cooling amount is small. Therefore, the evaporator 23 is required to have a cooling capacity.

Accordingly, the degree of opening (SW1) of the passenger's side air mix damper 15b is determined to be 0% in step 122, so that a cold wind is blown out from the passenger seat lower outlet 11b. As a result of the foregoing, a cold wind is sucked into the inside air entrance 25 very close to the passenger seat lower outlet 11b, and the temperature of the upstream position of the air flow in the evaporator 23 is lowered. In this way, the cooling capacity of the evaporator 23 is reduced, and the power consumption of the compressor 27 can be reduced. In the second example, this step 122 composes the heating amount minimizing control means.

In the case where it is judged to be NO in step 121, that is, in the case where the refrigerant is not flowing in the evaporator 23, the temperature of air is not changed even after it has passed through the evaporator 23. Therefore, the cooling load of the evaporator 23 is not generated when air passes through it. On the other hand, the refrigerant flows in the condenser 28, and this condenser 28 is activated as a heater. Air is slightly heated when it passes through the condenser 28, so that the condenser 28 is required to have a certain amount of heating capacity.

Accordingly, the degree of opening (SW1) of the passenger's side air mix damper 15b is determined to be 100% in step 123, so that a hot wind is blown out from the passenger seat lower outlet 11b. Due to the foregoing, the temperature of the upstream position of the air flow in the evaporator 23 can be raised. At this time, the temperature of air is not changed even after it has passed through the evaporator 23. Therefore, the temperature of the upstream position of the air flow in the condenser 28 is raised, so that the heating capacity of the condenser 28 is lowered. As a result, the power consumption of the compressor 27 can be reduced. In this connection, in the second example, this step 123 composes the first heating amount maximizing control means.

Next, in steps 114 and 115, the blower voltage is determined, and then each servo motor and motor controller are controlled.

As described above, in the second example in which the air conditioner is applied to an electric automobile, in the case where only the driver is seated in the vehicle cabin in the inside air circulation mode and the refrigerant is flowing in the evaporator 23, the air blowing mode on the passenger seat side is set in the foot mode and the temperature of air blown out onto the passenger seat side is cooled in the maximum cooling condition. Due to the foregoing, the temperature of the upstream position of the the air flow in the evaporator 23 can be lowered. Accordingly, the power consumption of the compressor 27 can be reduced.

In the case where only the driver is seated in the vehicle cabin in the inside air circulation mode and the refrigerant is not flowing in the evaporator 23, the air blowing mode on the passenger seat side is set in the foot mode and the temperature of air blown out onto the passenger seat side is heated in the maximum heating condition. Due to the foregoing, the temperature of the upstream position of the the air flow in the condenser 28 can be raised. Accordingly, the power consumption of the compressor 27 can be reduced.

In the second example described above, when only one passenger is seated in the vehicle cabin in the inside air circulation mode, the air blowing mode on the passenger seat side is forcibly controlled to be the foot mode. However, the air blowing mode on the passenger seat side may be forcibly controlled to be the high level mode.

Figure 15:
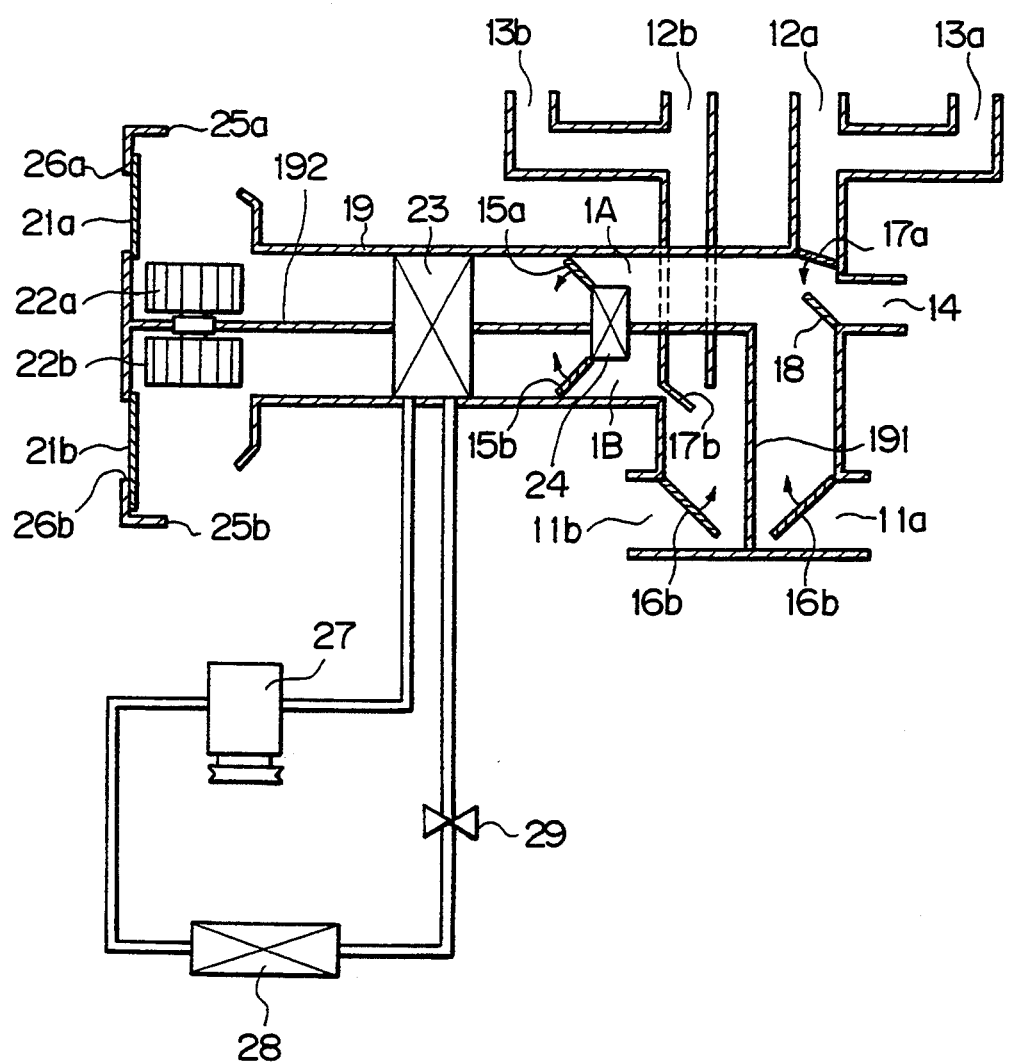
FIG. 15 is an overall arrangement view of the air duct system of the third example of the present invention.

Next, with reference to FIG. 15, the third example of the present invention will be explained as follows.

The air duct 19 in the upstream position of the evaporator 23 is divided into a driver's seat side passage and an passenger seat side passage by a partition plate 192. This driver's seat side passage is provided with a driver's seat side inside air entrance 25a and a driver's seat side outside air entrance 26a. This driver's seat side inside air entrance 25a is open at a position close to the foot position of the driver's seat. The driver's seat side passage is provided with a driver's seat side inside and outside air changeover damper 21a to selectively change over between the inside air entrance 25a and the outside air entrance 26a, and also provided with a driver's seat side blower 22a.

The passenger seat side passage is provided with a passenger seat side inside air entrance 25b and a passenger seat side outside air entrance 26b. This passenger seat side inside air entrance 25b is open at a position close to the foot position of the passenger seat. The passenger seat side passage is provided with a passenger seat side inside and outside air changeover damper 21b to selectively change over between the inside air entrance 25b and the outside air entrance 26b, and is also provided with a passenger seat side blower 22b.

The driver's seat side inside and outside air changeover damper 21a and the passenger seat side inside and outside air changeover damper 21b are driven by the same servo motor 40. That is, the driver's seat side inside and outside air mode and the passenger seat side inside and outside air mode are controlled to be the same. The driver's seat side blower 22a and the passenger seat side blower 22b are controlled by the same motor controller 37.

Figure 16:
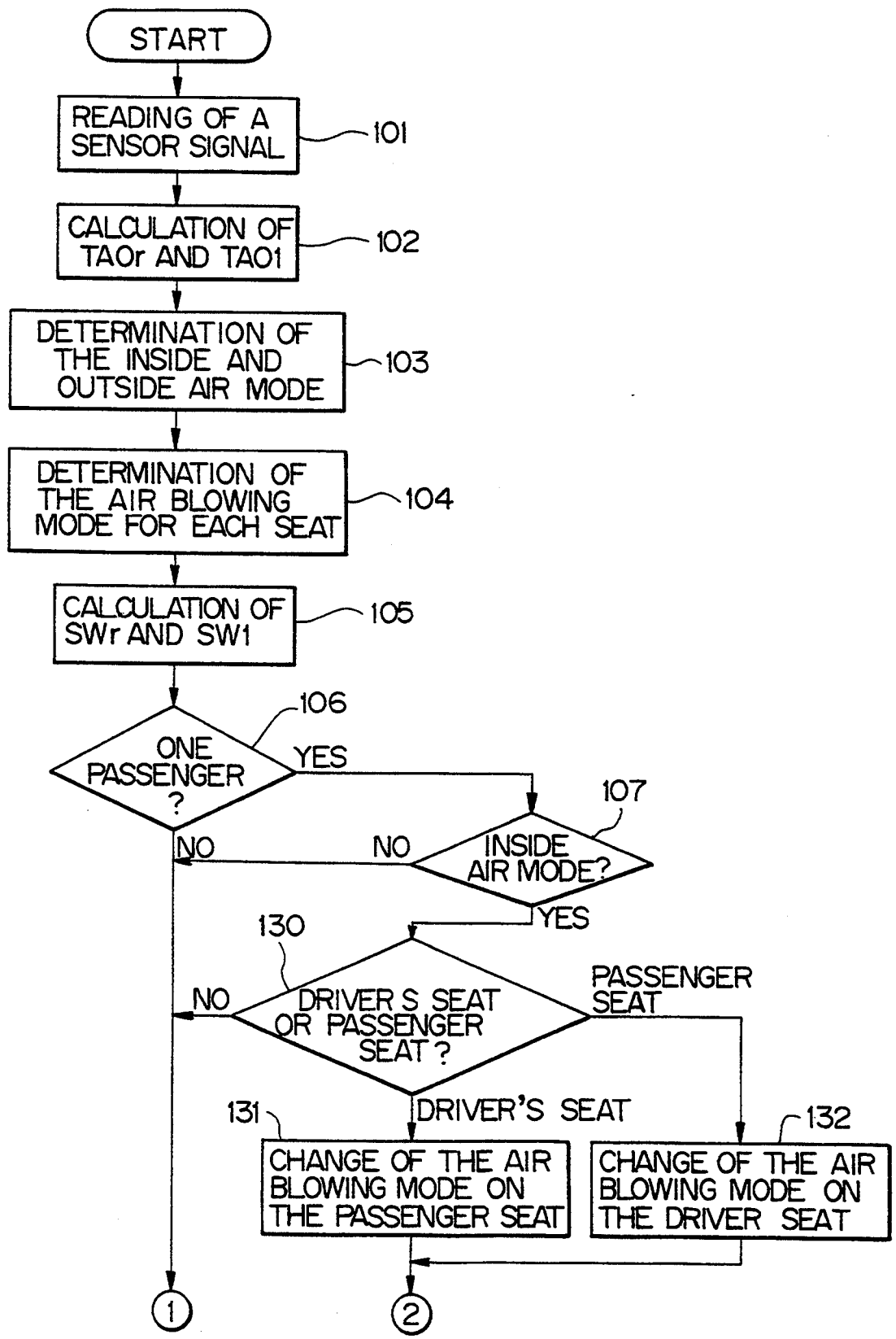
FIG. 16 is a flowchart showing the procedure of air conditioning control of the third example.

Next, with reference to FIGS. 16 and 17, the operation of the third example will be explained as follows.

First, when the control operations of steps 101 to 105 are conducted, the target blowing air temperature (TAOr, TAOl) of each seat, the inside and outside air mode, the air blowing mode of each seat, and the degree of opening (SWr, SWl) of each seat are found.

Next, in step 106, it is judged whether or not only one passenger is seated in the vehicle cabin. When it is judged to be YES in step 106, the program advances to step 107. When it is judged to be NO in step 106, the program advances to step 114 (shown in FIG. 17).

In step 107, it is judged whether or not the inside and outside air mode determined in step 103 is the inside air circulation mode. When it is judged to be YES in step 107, the program advances to step 130, and when it is judged to be NO in step 107, the program advances to step 114 (shown in FIG. 17).

In step 130, it is judged whether the one passenger is seated in the driver's seat or in the passenger seat. When it is judged that the passenger is seated in the driver's seat, the program advances to step 131, and the air blowing mode on the passenger seat side is determined to be the foot mode. When it is judged in step 130 that the passenger is seated in the passenger seat, the program advances to step 132, and the air blowing mode on the driver's seat side is determined to be the foot mode. When it is judged in step 130 that the passenger is seated in a seat except for the driver's and passenger seats, that is, the passenger is seated in the rear seat, that is, when it is judged to be NO in step 130, the program advances to step 114 (shown in FIG. 17). In the third example, the aforementioned steps 131 and 132 compose the outlet changeover control means.

After the control operation of step 131 or 132 has been completed, the program advances to step 133 (shown in FIG. 17), and it is judged whether or not the compressor 27 is driven. When it is judged to be YES in step 133, the program advances to step 134, and it is judged whether or not the seated passenger is a driver. When the driver is seated (YES), the degree of opening of the air mix damper 15b on the passenger seat side is determined to be 0% in step 135. When the seated passenger is a passenger in the passenger seat (NO), the degree of opening (SWr) of the air mix damper 15a on the driver's seat side is determined to be 0% in step 136. After that, the program advances to step 114. In the third example, the step 133 composes the evaporator refrigerant flow detection means. Also, in the third example, the steps 235 and 136 compose the first heating amount minimizing control means described before.

As described above, in the case where only the driver is seated in the vehicle cabin in the inside air circulation mode and the compressor 27 is turned on, a cold wind can be sucked into the passenger seat side inside air entrance 25b from the passenger seat lower outlet 11b when the control operations of steps 130, 131, 133, 134 and 135 are carried out. Therefore, the temperature of the upstream position of the air flow in the evaporator 23 can be lowered. As a result, the cooling capacity of the evaporator 23 is reduced, so that the power consumption of the compressor 27 can be reduced.

In the case where only the passenger is seated in the vehicle cabin in the inside air circulation mode and the compressor 27 is turned on, a cold wind can be sucked into the driver's seat side inside air entrance 25a from the driver's seat lower outlet 11a when the control operations of steps 130, 132, 133, 134 and 136 are carried out. Therefore, the temperature of the upstream position of the air flow in the evaporator 23 can be lowered. As a result, the cooling capacity of the evaporator 23 is reduced, so that the power consumption of the compressor 27 can be reduced.

In this connection, in the case where it is judged to be NO in step 133, it is judged in step 137 whether the seated passenger is a driver or not. In the case where the driver is seated (YES), in accordance with the air blowing mode determined in step 104 (shown in FIG. 16), it is judged in step 138 whether or not the air blowing mode on the driver's seat side is the foot mode (the heating mode). In the case where it is judged in step 138 that the air blowing mode on the driver's seat side is the foot mode (the heating mode), that is, in the case where it is judged to be YES, the degree of opening (SWl) of the air mix damper 15b on the passenger's side is determined to be 100% in step 139. On the other hand, in the case where it is judged not to be the foot mode (the heating mode) in step 138, that is, in the case where it is judged to be NO, SWl is determined to be 0% in step 140. After that, the program advance to step 114. In this connection, in the third example, the step 138 described above and the step 141 described later compose the temperature adjustment condition detection means. Also, in the third example, the step 139 described above and the step 142 described later compose the second heating amount maximizing means described before.

As described above, in the case where only the driver is seated in the vehicle cabin in the inside air circulation mode and the compressor 27 is turned off and the foot mode (the heating mode) is set on the driver's seat side, a hot wind can be sucked into the passenger seat side inside air entrance 25b from the passenger seat lower outlet 11b when the control operations of steps 130, 131, 133, 137, 138 and 139 are carried out. Therefore, the temperature of the upstream position of the air flow in the heater core 24 can be raised. As a result, the heating capacity of the heater core 24 is reduced, so that the fuel consumption of the engine can be reduced.

In the case where it is judged to be NO in step 137, that is, in the case where the passenger is seated in the passenger seat, in accordance with the air blowing mode determined in step 104 (shown in FIG. 16), it is judged in step 141 whether or not the air blowing mode on the passenger seat side is the foot mode (the heating mode). In the case where it is judged in step 141 that the air blowing mode on the passenger seat side is the foot mode (the heating mode), that is, in the case where it is judged to be YES in step 141, the degree of opening (SWr) of the air mix damper 15a on the driver's seat side is determined to be 100% in step 142. On the other hand, in the case where it is judged in step 141 that the air blowing mode is not the foot mode (the heating mode), that is, in the case where it is judged to be NO in step 141, SWr is determined to be 0% in step 143. After that, the program advances to step 114.

As described above, in the case where only the passenger is seated in the vehicle cabin the inside air circulation mode and the compressor 27 is turned off and the foot mode (the heating mode) is set on the passenger seat side, a hot wind can be sucked into the driver's seat side inside air entrance 25a from the driver's seat lower outlet 11a when the control operations of steps 130, 132, 133, 137, 141 and 142 are carried out. Therefore, the temperature of the upstream position of the air flow in the heater core 24 can be raised. As a result, the heating capacity of the heater core 24 is reduced, so that the fuel consumption of the engine can be reduced.

Next, in steps 114 and 115, the air flow amounts of the driver's seat side blower 22a and the passenger seat side blower 22b, which correspond to the blower voltage, are determined, and the values determined in steps 103 and 114 are output into each servo motor and motor controller.

As described above, in the third example, in the case where only the driver is seated in the driver's seat, the reductions in the air conditioning loads of the evaporator 23 and the heater core 24 can be realized while the driver feels comfortable in the air-conditioned atmosphere. In the case where only the passenger is seated in the passenger seat, the reductions in the air conditioning loads of the evaporator 23 and the heater core 24 can be realized while the passenger feels comfortable in the air-conditioned atmosphere.

In the third example described above, in the case where only the driver is seated in his seat and the inside air circulation mode is employed, the passenger seat side air blowing mode is forcibly controlled to be the foot mode, however, the passenger seat side air blowing mode may be forcibly controlled to be the high level mode. In the third example, in the case where only the passenger is seated in his seat and the inside air circulation mode is employed, the driver's seat side air blowing mode is forcibly controlled to be the foot mode, however, the driver's seat side air blowing mode may be forcibly controlled to be the high level mode.

In the first to third examples of the present invention, when a passenger is seated in the driver's or the passenger seat, the control operation of the present invention is conducted. However, when the passenger is seated only in the rear seat, the control operation of the present invention may be conducted.

As described above, the present invention provides the following effects:

When only one passenger is seated in the vehicle cabin, he feels comfortable in the air-conditioned atmosphere, and the air-conditioning load of the heat exchanging means can be reduced. Further, in order to introduce the conditioned air to the upstream position of the air flow in the heat exchanging means, the existing outlet and inside air entrance are used without providing another air duct. Therefore, the spaces can be efficiently utilized, and the cost of the air conditioner can be reduced as compared with an air conditioner in which another air duct is provided for introducing the conditioned air.

I claim:

1. An air conditioner for use in a vehicle, comprising:

an air duct having an inside air entrance open to air inside a vehicle chamber and an outside air entrance open to air outside of said vehicle chamber at a first end of said air duct, and a plurality of outlets at positions opposed to a plurality of seats in said vehicle chamber at a second end of said duct;

air blowing means for generating an air flow in said air duct;

heat exchanging means provided in said air duct for exchanging heat of air in said air duct;

inside and outside air change-over means for selectively changing over said first end of said air duct between receiving air through said inside air entrance and receiving air through said outside air entrance;

air outlet change-over means for selectively operating said plurality of air outlets;

seating detection means for detecting a passenger in each of said plurality of seats; and air outlet change-over control means for, when only one passenger is detected in said vehicle, controlling said air outlet change-over means to open a first one of said plurality of air outlets opposed to said detected passenger's respective one of said plurality of seats and to open a second one of said plurality of air outlets closest to said inside air entrance of said air duct, and controlling said inside and outside air change-over means to open said inside air entrance;

wherein, when only one passenger is detected in said vehicle, air discharged from said second one of said plurality of air outlets closest to said inside air entrance is substantially sucked back through said inside air entrance of said air duct.

2. An air conditioner for use in a vehicle according to claim 1, wherein said heat exchanging means comprises:
   an evaporator composing a refrigerating cycle;
   a compressor;
   a condenser; and
   decompression means for decompressing and expanding refrigerant flowing into said evaporator.

3. An air conditioner for use in a vehicle according to claim 2, further comprising:
   a heater to heat air in said air duct;
   a plurality of temperature adjustment means for adjusting a heating amount of said heater;
   temperature adjustment control means for independently controlling each of said temperature adjustment means;
   evaporator refrigerant flow detection means to detect whether or not refrigerant is flowing in said evaporator; and
   heating amount minimizing control means for controlling said temperature adjustment control means to minimize said heating amount of said heater connected with said second one of said plurality of outlets when only one passenger is detected in said vehicle and when refrigerant is detected as flowing in said evaporator.

4. The air conditioner for use in a vehicle according to any one of claims 2 or 3, wherein:
   said inside air entrance of said air duct is at a position opposed to a front seat passenger's one of said plurality of seats;
   said plurality of outlets include:
      a driver's seat upper outlet at a position opposed to an upper portion of a driver's one of said plurality of seats,
      a driver's seat lower outlet at a position opposed to a lower portion of said driver's seat,
      a passenger seat upper outlet at a position opposed to an upper portion of said passenger's seat, and
      a passenger seat lower outlet at a position opposed to a lower portion of said passenger's seat; and
   said outlet changeover control means controls said outlet changeover means, when only one passenger in said vehicle is detected, to open a closest one of said passenger seat upper outlet and said passenger seat lower outlet to said inside air entrance.

5. An air conditioner for use in a vehicle according to claim 4, wherein, when only one passenger is detected in said vehicle, said inside and outside air change-over means selectively changes said first end of said air duct to receive air through said inside air entrance, said inside air entrance is closest to said passenger seat lower outlet of said plurality of outlets, and said outlet changeover means controls said passenger seat lower outlet to be open.

6. An air conditioner for use in a vehicle according to claim 4, wherein, when only one passenger is detected in said vehicle, said inside and outside air change-over means selectively changes said first end of said air duct to receive air through said inside air entrance, said inside air entrance is closest to said passenger seat upper outlet of said plurality of outlets, and said outlet changeover means controls said passenger seat upper outlet to be open.

7. An air conditioner for use in a vehicle according to claim 3, wherein said heater is a condenser composing a refrigerating cycle together with said evaporator, said air conditioner further comprising:
   temperature adjustment condition detection means for detecting a temperature adjustment condition of said temperature adjustment means; and
   first heating amount maximizing control means for, when only one passenger is detected in said vehicle, when refrigerant is not detected as flowing in said evaporator, and when said temperature adjustment means corresponding to said passenger's seat is in a heating mode, controlling said temperature adjustment control means so that an air heating amount of said condenser is maximized in accordance with a number of said detected passengers, said detected refrigerant flow, and said temperature adjustment condition detection means;
   said condenser being provided in said air duct for said second one of said plurality of outlets.

8. An air conditioner for use in a vehicle according to claim 3, wherein said heater is a heater core having a heat source of engine cooling water, said air conditioner further comprising:
   temperature adjustment condition detection means for detecting a temperature adjustment condition of said temperature adjustment means; and
   second heating amount maximizing control means for, when only one passenger is detected in said vehicle, when refrigerant is not detected as flowing in said evaporator, and when said temperature adjustment means corresponding to said passenger's seat is in a heating mode, controlling said temperature adjustment control means so that an air heating amount of said heater core is maximized in accordance with a number of said detected passengers, said detected refrigerant flow, and said temperature adjustment condition detection means;
   said heater core being provided in said air duct for said second one of said plurality of outlets.

* * * * *